(12) United States Patent
Kaminski et al.

(10) Patent No.: US 8,719,543 B2
(45) Date of Patent: May 6, 2014

(54) SYSTEMS AND METHODS IMPLEMENTING NON-SHARED PAGE TABLES FOR SHARING MEMORY RESOURCES MANAGED BY A MAIN OPERATING SYSTEM WITH ACCELERATOR DEVICES

(75) Inventors: Patryk Kaminski, Austin, TX (US); Thomas Woller, Austin, TX (US); Keith Lowery, Bothell, WA (US); Erich Boleyn, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 861 days.

(21) Appl. No.: 12/648,550

(22) Filed: Dec. 29, 2009
(Under 37 CFR 1.47)

(65) Prior Publication Data
US 2011/0161619 A1   Jun. 30, 2011

(51) Int. Cl.
*G06F 12/00* (2006.01)
*G06F 9/26* (2006.01)
*G06F 9/34* (2006.01)

(52) U.S. Cl.
USPC ............... 711/206; 711/207; 711/E12.059; 711/208; 711/209

(58) Field of Classification Search
None
See application file for complete search history.

(56) References Cited

U.S. PATENT DOCUMENTS 6,760,787 B2 *   7/2004   Forin .............................. 710/18
6,832,295 B1 *  12/2004   Stonecypher ................. 711/135
2005/0193081 A1 *  9/2005   Gruber et al. ................. 709/212
2006/0136697 A1 *  6/2006   Tsao et al. ..................... 711/206
2007/0168641 A1 *  7/2007   Hummel et al. ............... 711/206
2007/0168644 A1 *  7/2007   Hummel et al. ............... 711/207
2008/0104363 A1    5/2008   Raj et al.
2008/0215848 A1 *  9/2008   Sheu et al. ..................... 711/207

OTHER PUBLICATIONS

International Preliminary Report on Patentability for International Application No. PCT/US2010/062231, mailed Jul. 12, 2012.
"AMD I/O Virtualization Technology (IOMMU) Specification," Internet Citation, Feb. 3, 2006, XP002413408. URL: http://www.amd.com./us-en/assets/content_type/white_papers_and_tech_docs/34434.pdf.
PCT International Search Report for PCT Application PCT/US2010/062231 mailed Mar. 18, 2011.
Non-Final Office Action for U.S. Appl. No. 12/648,556, mailed Oct. 25, 2012, 49 pages.

* cited by examiner

*Primary Examiner* — Edward Dudek, Jr.
*Assistant Examiner* — Matthew Chrzanowski
(74) *Attorney, Agent, or Firm* — Mahamedi Paradice Kreisman LLP

(57) ABSTRACT

Systems and methods are provided that utilize non-shared page tables to allow an accelerator device to share physical memory of a computer system that is managed by and operates under control of an operating system. The computer system can include a multi-core central processor unit. The accelerator device can be, for example, an isolated core processor device of the multi-core central processor unit that is sequestered for use independently of the operating system, or an external device that is communicatively coupled to the computer system.

32 Claims, 23 Drawing Sheets

SYSTEMS AND METHODS IMPLEMENTING NON-SHARED PAGE TABLES FOR SHARING MEMORY RESOURCES MANAGED BY A MAIN OPERATING SYSTEM WITH ACCELERATOR DEVICES

CROSS REFERENCE TO RELATED APPLICATIONS

This application is related to U.S. patent application Ser. No. 12/648,556, filed Dec. 29, 2009, and U.S. patent application Ser. No. 12/648,592, filed Dec. 29, 2009.

TECHNICAL FIELD

Embodiments of subject matter described herein generally relate to computer systems, and more particularly relate to systems and methods for sharing memory resources managed by a main Operating System (OS) with accelerator devices.

BACKGROUND

Most modern computer systems provide mechanisms for sharing memory between a main central processing unit (CPU) and accelerator devices (e.g., input/output (IO) devices). For example, modern video cards, one example of an accelerator device, need to read large amounts of data from the main system memory. Fast network adapters, another exemplary accelerator device, will read data to transfer directly from memory and write packets that just arrived over the network directly into the system memory. Disk controllers, still yet another example of an accelerator device, may read data directly from memory and write it to magnetic disk media, or read data from the media and store it in the memory. These exemplary accelerator devices and others, while commonly separate, may ultimately form part of a device (e.g., a chip package) that includes the CPU or be formed on or with the CPU on a single chip.

Direct Memory Access (DMA)

One technique commonly used to share memory between a main CPU and accelerator devices is called Direct Memory Access (DMA). The operating system will configure a block of physical memory to be directly accessed by an accelerator device. This is typically done by directly programming special registers in the DMA controller. The DMA controller will then transfer the data between the system memory and the accelerator device. However, with simple DMA controllers the block of system memory may have to be physically continuous. This may be a problem for certain devices that need to transfer large amounts of data at a time. This is because allocating a large continuous block of physical memory may not always be possible due to memory fragmentation.

Scatter-Gather DMA

More sophisticated DMA controllers can work around this restriction by supporting scatter-gather DMA transfers. Such controllers can work with memory buffers that are not continuous in physical memory. For example, a linked-list mechanism could be used to describe all the fragments that the memory buffer is made of. The DMA controller will then automatically follow the linked-list during the transfer of the data between the buffer and the accelerator device.

Using DMA is relatively easy if a sufficiently large memory block (to be used for DMA transfers) can be pre-allocated ahead of time. This is a very common approach used by many device drivers. However, DMA transfer may not be possible or practical in some cases. For instance, it is often not possible to pre-allocate the memory buffer because the memory where the data is to be transferred to/from is allocated by a user process that may not be aware of the DMA.

For instance, consider an application that reads a data file (e.g., such as a large video file) from disk, processes it, and sends it over a network. In this case, the application may allocate a block of virtual memory where the data is read from disk. It may then process the data in place or it may copy the processed video file to another block in virtual memory. Using the DMA approach, the application will invoke an application programming interface (API) that will cause the OS or a device driver to pin the data block in physical memory, program the DMA controller and transfer the data between the physical memory and accelerator device. With simple DMA controllers multiple DMA transfers may be required if the data is fragmented. Even if the DMA controller supports the scatter-gather mechanism, there is still a significant burden on the OS, device driver, application and programmer to ensure that all the components correctly cooperate. The application may have to invoke special APIs to allocate the buffer. If the data is already located at another location in virtual memory, the CPU may have to copy the data to the DMA buffer before the actual DMA transfer can begin. The programmer must constantly take into account the requirements of the DMA controller (which may differ from system to system), ensure that the memory is not used while the DMA transfer is in progress, prevent the memory from being released until the DMA transfer completes, etc.

Limitations of DMA in Modern Multi-Threading Environments

In modern systems where the programmer has to control multiple threads that are executing concurrently, all these tasks become even more complex and can easily lead to errors and/or performance issues. For example, a programmer may want to take advantage of an accelerator device (e.g., a graphics processing unit—aka a GPU—which may be present on a video card, on the same board as the CPU, or integrated into another device such as a northbridge or the CPU) to perform some computational work on the data. The data may already be in memory, but that memory may not be accessible to the DMA controller. As such, the application will have to allocate another memory buffer that is accessible to the DMA controller, copy the data to the buffer, initiate DMA transfer, wait for the accelerator device to process the data, transfer (via DMA) the results back into system memory, and finally copy the data to a desired location in the application virtual memory address space. In this example there are two memory-to-memory copy operations and two DMA transfers between the system memory and the accelerator device. Further, at least parts of the memory had to be pinned (to prevent them from being swapped out or reused by another process). The memory-to-memory copy operations are typically very computationally expensive and can easily lead to major performance degradation. Even if the memory-to-memory copy operations can be avoided, there may still be other problems. Examples of other problems include cache coherency (e.g., DMA transactions typically require that cache is disabled for the specified memory address range), security problems (e.g., it may be difficult to indicate what parts of memory are accessible for read/write operations and what parts of memory are read-only), etc. In general this approach is better suited for programs that require few large memory transfers rather than for programs that require frequent but small memory transfers from different locations in the program virtual memory address space.

Graphics Address Remapping Table (GART)

A more complex mechanism that tries to solve the memory sharing problem is the Graphics Address Remapping Table (GART) which is used by a GPU to perform physical-to-physical translation of memory addresses. It provides the GPU with a virtual, contiguous memory view, even though the actual data may be scattered across randomly allocated pages.

One limitation of GART is that it requires prior knowledge of where the data (that will be accessed by the GPU) resides, so that the CPU can map it as appropriate in the GART tables. This again creates serious restrictions on the programmer. There is no easy workaround if the GPU unexpectedly needs to access data in memory that is not currently mapped in the GART tables.

Another limitation is that there is no concept of multiple address spaces in GART. The GART tables may have to be re-programmed every time there is a context switch between the processes that use the GPU for computations. If two different processes try to use the GPU at the same time, the GART tables may need to contain mapping entries that point to memory used by both processes. This creates potential security problems because it allows one process to execute code on the GPU that could potentially access the memory of another process (via GART mechanism).

Thus, there are significant limitations when using DMA or GART mechanisms. A significant drawback is the fact that the OS, driver and/or application must know, in advance, what memory would be accessed by the IO device to properly configure the DMA or GART before the IO device began processing the data. For example, the IO device might obtain the address of the data in virtual memory as part of its computation. With the DMA or GART approach the device could not simply access the data at the new address. Instead it would require intervention from the OS/driver/application to reconfigure the DMA/GART to allow the IO device to access the new memory location.

BRIEF SUMMARY OF EMBODIMENTS

Systems and methods are provided that can allow for an accelerator device to share physical memory of a computer system that is managed by and operates under control of an operating system. The computer system can include a multi-core central processor unit. The accelerator device can be, for example, an isolated core processor device that is sequestered for use independently of the operating system, or an external device that is communicatively coupled to the computer system. In one implementation, the external device can be a specialized processor that performs tasks independently of the multi-core central processor unit and does not directly execute operating system code.

In accordance with some of the disclosed embodiments, when the operating system creates a process for the accelerator device, the operating system creates a plurality of operating system (OS) page tables for memory management. Each of the OS page tables includes a plurality of page table entries that are used to store mappings of virtual memory addresses to physical memory addresses in the physical memory. A driver creates another set of non-shared page tables that are independent of the operating system and are to be used exclusively by the accelerator device to share the physical memory when the accelerator device needs to access a block of memory in a virtual memory address space (VMAS) assigned the process. Each of the non-shared page tables correspond with one of the OS page tables. The physical memory is divided into a plurality of memory pages, and each of the OS page tables can be associated with corresponding ones of the memory pages. Each of the non-shared page tables are also associated with corresponding memory pages in the physical memory. In one implementation, the driver can provide the addresses of the non-shared page tables to the accelerator device.

The driver can monitor for page fault notifications generated by the accelerator device and handle any page fault notifications received from the accelerator device. When a request for access to the physical memory causes the accelerator device to generate a page fault notification, the driver can determine a memory address space and virtual memory location of a process that contains a virtual memory address specified in the request for access to the physical memory. The driver can then determine whether the request for access to physical memory is a valid request. If the request is determined to be valid, the driver "pins" a limited amount of memory pages of the physical memory for use by the accelerator device to prevent the process from releasing limited amount of memory pages of the physical memory. To update the non-shared page table for the memory pages being used by the accelerator device, the driver can add new page table entries to the non-shared page table or edit existing page table entries in the non-shared page table. When the shared page table is updated, the driver can notify the accelerator device that the page fault has been successfully handled and that the accelerator device is permitted to resume processing. When processing resumes the accelerator device can then use the updated page table entries from the non-shared page table to perform virtual address translation.

This summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
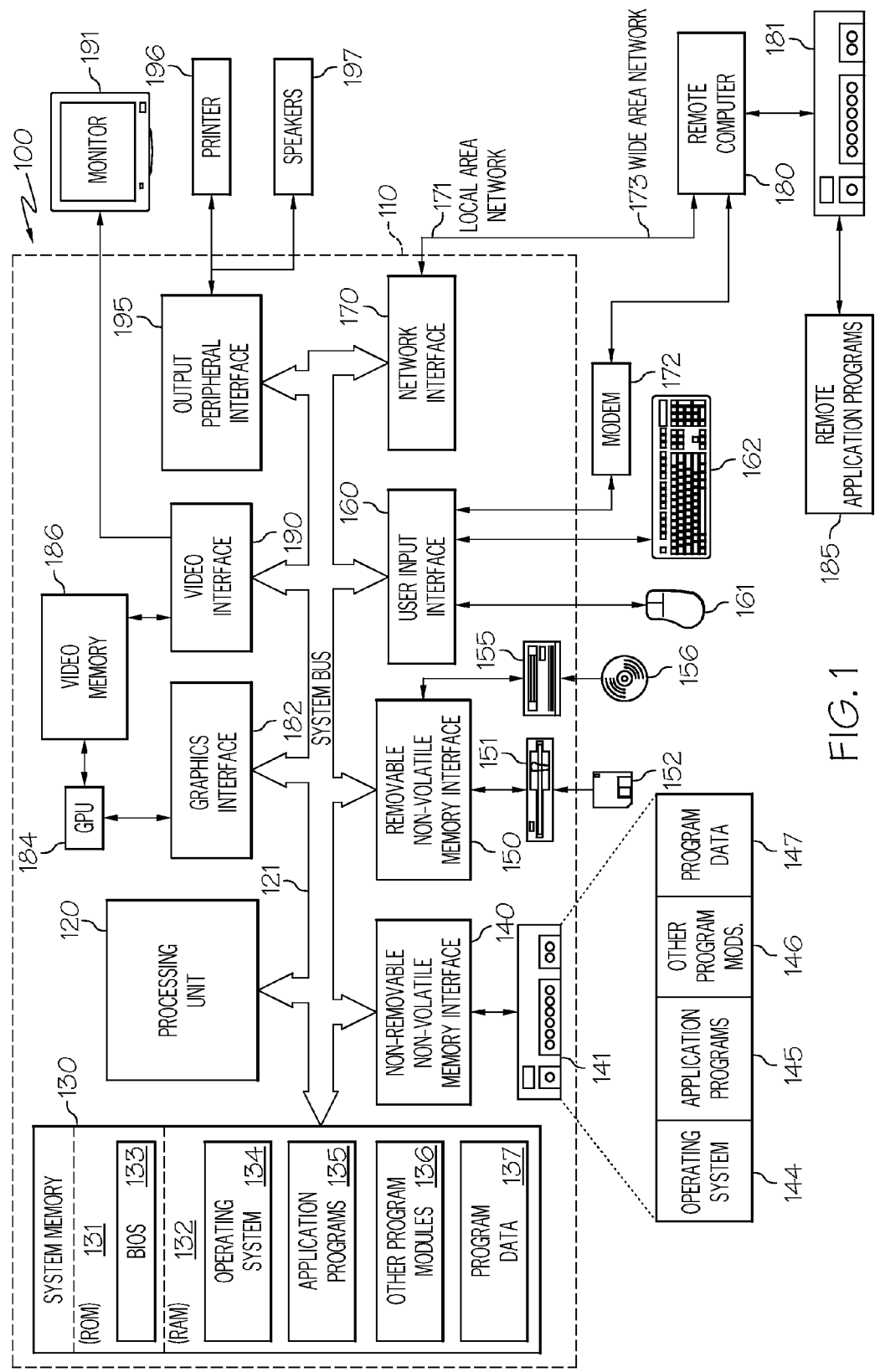
FIG. 1 is a block diagram that illustrates an example of a computing system environment in which the disclosed embodiments may be implemented.

As a preliminary matter, the following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Prior to describing embodiments of the present subject matter, some definitions of basic terms that are used throughout this application will be provided.

Definitions

As used herein, the term "accelerator device" refers to a specialized processor/engine that is a specialized processor or chip that does not directly execute main OS code. It can be used to perform tasks independent of the CPUs. It can access shared system physical memory and virtual memory, but may require OS/driver assistance and may require specialized hardware (e.g., IOMMU) to do so. Accelerator devices can be advanced or simple.

In general, an advanced accelerator device has its own instructions set in private or shared memory, and as it executes these instructions, it may access data in private or shared memory. Examples of advanced accelerator devices include a Graphics Processing Unit (GPU), an embedded central processor unit (CPU), other special-purpose computer systems which require very fast and/or very consistent response times, or any other processor designed to share the memory (e.g., a low power advanced reduced instruction set computer (RISC) machine (ARM) CPU working side-by-side with the main CPU).

A simple accelerator device may only be designed to perform simple operations. It may be designed (hardcoded or hardwired) for one type of operation, and it would only access the shared virtual memory to read/write data. Examples of simple accelerator devices include encryption/decryption devices, compression devices, network accelerators, etc.

As used herein, the term "kernel" refers to a portion of an operating system that is maintained in main memory and includes the most heavily used portions of software. Its responsibilities include managing a computer system's resources (e.g., the CPU, memory, I/O devices) and allowing other programs to run and use these resources. A process defines which memory portions the application can access. The kernel has full access to the system's memory and must allow processes to safely access this memory as they require it. Virtual memory addressing allows the kernel to make a given physical memory address appear to be another address, the virtual memory address. As a result, operating systems can allow programs to use more memory than the system has physically available. When a program needs data which is not currently in RAM, the CPU signals to the kernel that this has happened, and the kernel responds by writing the contents of an inactive memory block to secondary storage (e.g., hard disk) (if necessary) and replacing it with the data requested by the program. The program can then be resumed from the point where it was stopped. Virtual memory addressing also allows creation of virtual partitions of memory in two disjointed areas, one being reserved for the kernel (kernel space) and the other for the applications (user space). The applications are not permitted by the processor to address kernel memory, thus preventing an application from damaging the running kernel. To perform useful functions, processes need access to devices connected to the computer, which are controlled by the kernel through device drivers. The kernel has to provide the I/O to allow drivers to physically access their devices through some port or memory location. The kernel responds to calls from processes and interrupts from devices.

As used herein, the term "kernel mode device driver" refers to a driver that runs in protected or privileged mode, and has full, unrestricted access to the system memory, devices, processes and other protected subsystems of the OS. By contrast, a user mode device driver (UMDD) refers to a device driver that does not run in protected (or privileged) mode. UMDD cannot gain access to system data except by calling appropriate OS API.

A memory management unit (MMU) is a computer hardware component responsible for handling accesses to memory requested by the CPU. One of the main functions of the MMU is virtual memory management (i.e., translation of virtual memory addresses to their corresponding physical memory addresses). An OS assigns each process its own virtual memory address space, and the MMU divides the virtual memory address space (the range of addresses used by the processor) into pages. The MMU can translate virtual page numbers to physical page numbers via an associative cache called a Translation Lookaside Buffer (TLB) (described below). When the CPU attempts to access memory (e.g., attempts to fetch data or an instruction located at a particular virtual memory address or attempts to store data to a particular virtual memory address), the virtual memory address must be translated to a corresponding physical memory address. When the TLB lacks a translation, a slower mechanism page table mechanism is used. From the page table, the MMU looks up the real address corresponding to a virtual memory address, and passes the real address to the parts of the CPU which execute instructions. The data found in such page tables are typically called page table entries (PTEs). A PTE or TLB entry may also include information about whether the page has been written to (the dirty bit), when it was last used (the accessed bit, for a least recently used page replacement algorithm), what kind of processes (user mode, supervisor mode) may read and write it, and whether it should be cached. When a TLB entry or PTE prohibits access to a virtual page (e.g., because no physical random access memory has been allocated to that virtual page and the page tables indicate that the virtual memory page is not currently in real memory), the MMU signals a page fault exception (special internal signal) to the CPU which invokes the OS's paging supervisor module. The OS then handles the situation, perhaps by trying to find a spare frame of RAM and set up a new PTE to map it to the requested virtual memory address. If no RAM is free, it may be necessary to choose an existing page, using some replacement algorithm, and save it to disk. With some MMUs, there can also be a shortage of PTEs or TLB entries, in which case the OS will have to free one for the new mapping.

As used herein, the term "page table" refers to a data structure used by a virtual memory system in an operating system to store the mapping between virtual memory addresses and physical memory addresses. Virtual memory addresses are those unique to the accessing process. Physical memory addresses are those unique to the CPU. Page tables are used to translate the virtual memory addresses seen by the application program into physical memory addresses (also referred to as "real addresses") used by the hardware to process instructions. A page table includes a number of entries.

As used herein the term "page table entry" refers to an entry in a page table that includes a mapping for a virtual page to either (1) the real memory address at which the page is stored (e.g., at RAM), or (2) an indicator that the page is currently held in auxiliary memory (e.g., a hard disk file).

As used herein, the term "pin" indicates that the underlying physical memory page cannot be released.

As used herein, the term "process" refers to an instance of a computer program that is running or in execution by a computer system that has the ability to run several computer programs concurrently (i.e., a program with one or more threads that is being sequentially executed in an execution state). Each process is controlled and scheduled by a main operating system (OS) of a computer. The terms "process" and "task" can be used interchangeably herein.

As used herein, the term "sequestered processor core" can refer to an isolated processor core of a multi-core CPU system (e.g., an isolated x86 processor core) that is sequestered for use independently of a main OS. Each processor core is part of a multi-core processor. Sequestered processor cores can be used to as de facto accelerator devices as described in concurrently filed U.S. patent application Ser. No. 12/648,592, entitled "Hypervisor Isolation of Processor Cores," naming Woller et al. as inventors and being assigned to the assignee of the present invention, which is incorporated herein by reference in its entirety.

As used herein, a translation lookaside buffer (TLB) is a cache of recently used mappings from the operating system's page table that memory management unit (MMU) hardware uses to improve virtual memory address translation speed. When a virtual memory address needs to be translated into a physical memory address, the TLB is searched first. A TLB has a fixed number of slots that contain address translation entries, which map virtual memory addresses to physical memory addresses. It is typically a content-addressable memory (CAM), in which the search key is the virtual memory address and the search result is a physical memory address. If the requested address is present in the TLB (i.e., a TLB hit), the CAM search yields a match quickly, the physical memory address is returned after which the physical memory address can be used to access memory and memory access can continue. If the requested address is not in the TLB (i.e., a TLB miss), the MMU will generate a processor interrupt called a page fault. The operating system will have an interrupt handler to deal with such page faults. The translation proceeds by looking up the page table in a process called a page walk. After the physical memory address is determined, the virtual memory address to physical memory address mapping and the protection bits are entered in the TLB.

As used herein, the term virtual memory address space (VMAS) refers to a well-known memory mapping mechanism available in modern operating systems. As will be understood by those skilled in the art, each time an application is run on an operating system (OS), the OS creates a new process and a new VMAS for this process; the OS manages the mapping between the VMAS and the files that hold its values. A VMAS corresponding to a particular application program is divided into pages (also called a memory pages or virtual pages) that can be thought of as a block of contiguous virtual memory addresses. More specifically, a page is a fixed-length block of main memory that is contiguous in both physical memory addressing and virtual memory addressing. In most cases, a page is the smallest unit of data for (1) memory allocation performed by the OS for a program, and (2) transfer between main memory and any other auxiliary store, such as hard disk drive.

As used herein, the term "virtual memory (VM)" refers to computer system technique which gives an application program the impression that it has contiguous working memory (an address space), while in fact it may be physically fragmented and may even overflow on to disk storage. Various aspects of VM are described, for example, in Operating Systems: Internals and Design Principles, Sixth Edition (2009) by William Stallings, which is incorporated by reference herein in its entirety.

Overview

Existing Operating Systems are unable to provide proper virtual memory management support for accelerator devices that utilize the system memory within a computer, yet contain independent memory management capabilities. Prior mechanisms for sharing memory between a main CPU and accelerator devices and allowing an accelerator device to access data in user space have involved use of DMA, GART or similar mechanism. There are significant limitations when using these mechanisms.

For instance, these mechanisms require the OS to allocate designated memory for exclusive use by the accelerator device, which poses severe restrictions on the design of the accelerator device, the OS and applications. In the case of a DMA transfer, for example, the OS must allocate, in advance, the memory buffer or pin the user application address space area. This requires that the application/OS to predict in advance what memory location will be accessed by the accelerator device. If the accelerator device attempts to access any other memory location, memory corruption or other errors may occur. As such, applications executing in system memory which utilize computational resources (e.g., CPU processor cores) contained within devices that are not under direct control of the main Operating System, will not be able to execute without an opportunity for memory data corruption due to memory buffer data discrepancies or severe restrictions on the application design.

To enable maximum flexibility for programmers, it would be desirable if an accelerator device can access an arbitrary system memory location. The memory sharing mechanism should also automatically provide minimum security guarantees. For example, an accelerator device such as a GPU should have the same view of memory as the process that scheduled the work for the accelerator device (i.e., the accelerator device should operate in virtual memory address space of the process).

If there are multiple processes that simultaneously issue work for the accelerator device, the memory sharing mechanism should ensure while the accelerator device executes a work item for one process that it can only access the virtual memory of that process and not of any other process.

In addition, it is important that the memory sharing mechanism can also be configured and reconfigured at any arbitrary moment. The program executing on the accelerator device may not know ahead of time what data will it require, and where the data will be located in physical memory. In fact the entire memory for the data may not have yet been allocated when the accelerator device began to execute the work item. There should be a mechanism for the accelerator device to signal that it needs to access data that is not present in physical memory, and resume the work when the required data/memory becomes available.

In other words, code executed on sequestered CPU processor cores should operate in virtual memory address space of the process that created/scheduled the work unit. The x86 CPU already has a mechanism to provide a virtual to physical memory address translation using page tables. Other accelerator devices could achieve the same behavior by using IOMMU or other, similar mechanism.

The memory sharing mechanism should generally be OS agnostic (although the specific implementations may require OS specific knowledge), and should minimize any changes to the OS kernel. If possible, a driver model should be used instead. In addition, it would be desirable if the memory sharing mechanism is portable to other accelerator devices including those that may not be able to use page tables to perform address translation on their own.

The disclosed embodiments provide memory sharing systems and methods for addressing the deficiencies of prior mechanisms described above. The disclosed systems and methods allow accelerator devices to operate in virtual memory address space (VMAS) of a process. In accordance with the disclosed embodiments, an accelerator device can negotiate for access to virtual memory address space (VMAS) assigned to or "owned by" an existing process (e.g., user process or system process) so that the accelerator device can operate in a VMAS assigned to the existing process, and share main system memory with general purpose CPU processor cores. In some implementations, multiple accelerator devices can operate on the same VMAS at the same time (i.e., a VMAS can be shared by two or more different accelerator devices). In accordance with the disclosed embodiments, the accelerator device can execute instructions and access/modify data in VM even when the accelerator device does not run the same OS. The disclosed embodiments can allow virtual memory (VM) management to occur independently of the main OS, which results in less contention for OS managed resources, allowing higher quality of service for applications controlled within this environment. If the accelerator device decides that it needs to access some new memory location, it can automatically do so on its own and can begin processing data without prior knowledge of where the data (that will be accessed by the accelerator device) resides. These mechanisms are not only automatic, but also enable some essential security guarantees.

In accordance with some of the disclosed embodiments, a kernel mode device driver creates and maintains a set of page tables to be used by the accelerator device to provide a consistently correct view of main system memory. These page tables will be referred to herein as separate "non-shared" page tables. These separate non-shared page tables are independent from the OS (i.e., the page tables used by the accelerator device are independent of the page tables used by the CPU for accessing process virtual memory).

In accordance with some other disclosed embodiments, when the accelerator device supports page tables for memory management, the main Operating System of a computer creates and maintains a set of "shared" page tables that are shared with an accelerator device. In these embodiments, the accelerator device must support page tables in the same format as a main CPU so that the page tables can be shared.

The disclosed embodiments can be applied to a wide variety of accelerator devices including "sequestered" CPU processor cores.

Prior to describing the disclosed embodiments, a description of a general-purpose computing device will be provided with reference to FIG. 1 to describe one exemplary, non-limiting computing environment in which the disclosed embodiments can be implemented. For the sake of brevity, conventional techniques related to general purpose computers, software development, programming languages, virtual memory, may not be described in detail herein. Moreover, the various tasks and process steps described herein may be incorporated into a more comprehensive procedure or process having additional steps or functionality not described in detail herein. In particular, various steps related to the execution of software code are well known and so, in the interest of brevity, need not be described in detail herein.

Exemplary Computing System

FIG. 1 and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that a CPU exists in a computing environment. While a general purpose computer is described below, this is but one example. Thus, the disclosed embodiments may be implemented in an environment of networked hosted services in which very little or minimal client resources are implicated, e.g., a networked environment in which the client device serves merely as an interface to the network/bus, such as an object placed in an appliance.

The disclosed embodiments can be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the disclosed embodiments may be practiced with other computer system configurations and protocols. Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, and the like.

FIG. 1 is a block diagram that illustrates an example of a computing system environment 100 in which the disclosed embodiments may be implemented, although as made clear above, the computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary operating environment.

With reference to FIG. 1, an exemplary system for implementing the invention includes a general purpose computing device in the form of a computer 110. Components of computer 110 may include, but are not limited to, one or more processing units 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and HyperTransport (HT) bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 2:
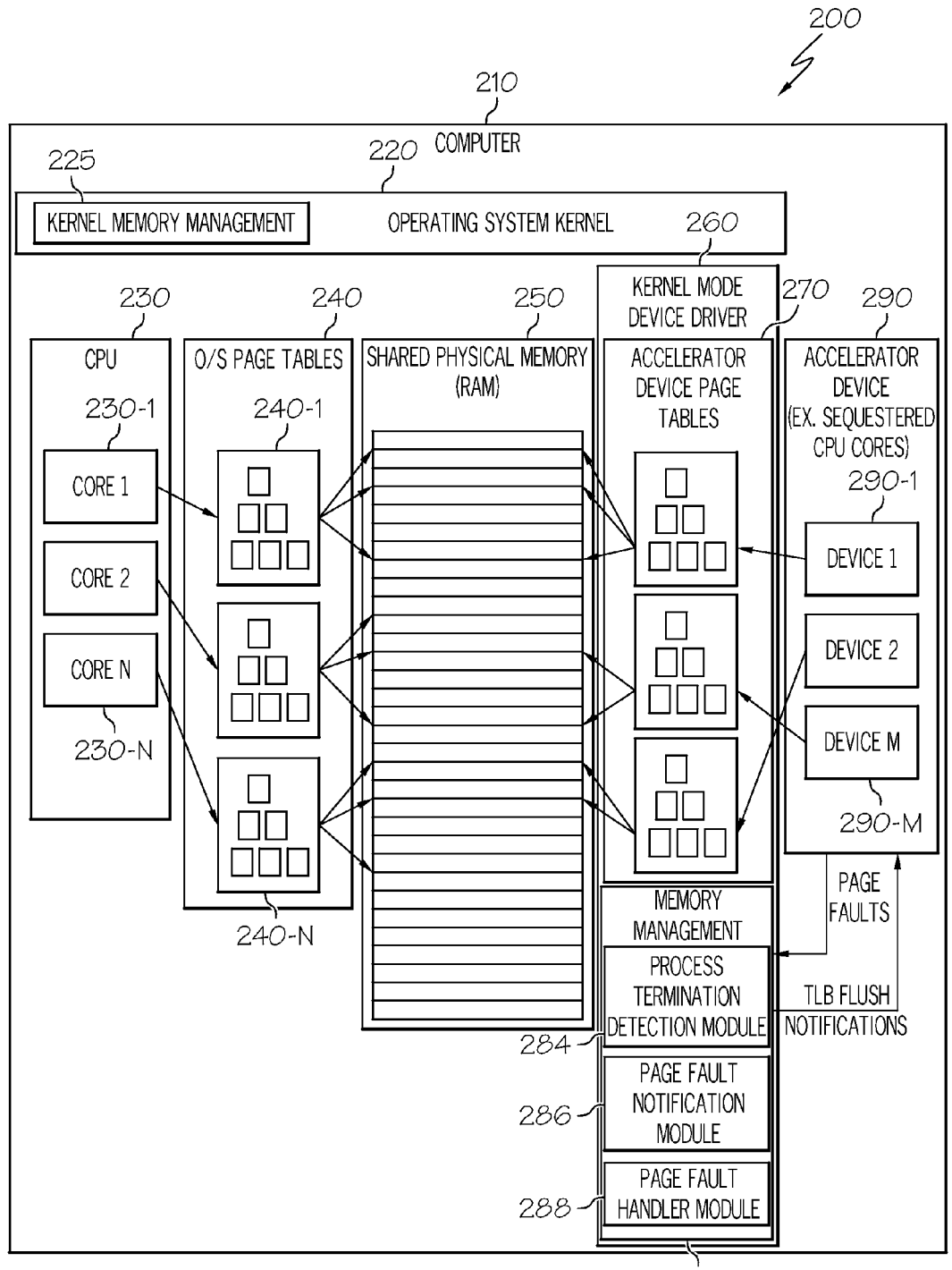
FIG. 2 is a block diagram of a computer system and a plurality of accelerator devices in accordance with some of the disclosed embodiments.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144 (i.e., software that controls execution of programs and that provides services such as resource allocation, scheduling I/O control, data management, memory management, etc.), application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of an accelerator device. A wide variety of other types of accelerator devices may be included in computer 110 or in communication with the computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory storage device 181. It will be appreciated that the network connections shown are exemplary and other means of establishing a communications link between the computers may be used.

FIG. 2 is a block diagram of a computer system 210 and a plurality of accelerator devices 290 in accordance with some of the disclosed embodiments.

The computer system 210 includes an operating system kernel 220, a plurality of CPU processor core devices 230-1 . . . N, a kernel mode device driver (KMDD) 260 (referred to below simply as a device driver 260 or driver 260) for the various accelerator devices 290, and a shared physical memory 250 (e.g., RAM) that operates in accordance with virtual memory (VM) address translation techniques (e.g., translating virtual memory addresses used by the CPU (and its cores) to memory addresses at the memory 250). As used herein, the term "kernel mode device driver" refers to a driver that runs in protected or privileged mode, and has full, unrestricted access to the system memory, devices, processes and other protected subsystems of the OS. Operation of the computer system's operating system kernel 220, the device driver 260 and the accelerator devices 290 will be described below with reference to FIGS. 4, 6, 8 and 9.

When a process requests access to its virtual memory, it is the responsibility of the OS to map the virtual memory address provided by the process to the physical memory address where that virtual memory is mapped to. The OS stores its mappings of virtual memory addresses to physical memory addresses in a page table. The operating system kernel 220 creates and maintains a plurality of OS page tables 240-1 . . . N. In FIG. 2, each of the boxes 240-1 . . . N represents a page table, and the smaller rectangles in each page table 240-1 . . . N represent a hierarchical collection of multiple tables that are part of that page table. The shared physical memory 250 that includes a plurality of pages (where each page is designated by a row of a column in FIG. 2).

Each of the CPU processor cores 230 can be associated with a corresponding one of the OS page tables 240-1 . . . N (as indicated by the arrows linking particular ones of the CPU processor cores 230 with corresponding ones of the OS page tables 240-1 . . . N). Each of the OS page tables 240-1 . . . N include a plurality of page table entries (not shown) that are each mapped to particular locations in the shared physical memory 250 as indicated by the arrows linking a particular one of the OS page tables 240-1 . . . N with locations at the shared physical memory 250.

The accelerator devices 290 can be internal devices that are part of the computer system 210 (e.g., an isolated core processor) or external devices that are communicatively coupled to the computer system 210.

The driver 260 creates and maintains another set of page tables 270-1 . . . N that are independent of the OS and are to be used exclusively by the various accelerator devices 290. Although FIG. 2 illustrates one exemplary embodiment where the page tables 270-1 . . . N for the accelerator devices 290 are created and maintained via the driver 260, in other embodiments, the page tables 270-1 . . . N for the accelerator device 290 can be created and maintained by the main OS kernel 220.

The accelerator devices 290-1 . . . M can each be associated with one or more of the page tables 270-1 . . . N. The page tables 270-1 . . . N are each associated with corresponding locations in the shared physical memory 250 as indicated by the arrows linking the page tables 270-1 . . . N with at corresponding one of the locations in the shared physical memory 250. In this sense, the page tables 240-1 . . . N, 270-1 . . . N are not shared by the accelerator devices 290 and the operating system kernel 220; rather, two separate sets of page tables (OS page tables 240-1 . . . N and accelerator page tables 270) are utilized at the operating system kernel 220 and the accelerator devices 290. In this embodiment, because the OS page tables 240-1 . . . N are not shared with accelerator devices 290, the page tables 240-1 . . . N, 270-1 . . . N will be referred to as "non-shared" page tables to distinguish them from "shared" page tables that will be described below with reference to FIG. 3.

The driver 260 also includes an independent memory management unit 280 (i.e., that is independent of the main kernel MMU 225 of the main OS kernel 220). The primary role of driver 260 is to handle the page faults (when the accelerator device 290 tries to access virtual memory area that is not currently in physical memory) and page table related tasks. The MMU 280 includes a process termination detection module 284 that detects when the process terminates (e.g., closes its last open handle), a page fault notification module 286 that receives page fault notifications and a page fault handler module 288 that handles the page fault notifications. These modules will be described in detail below. As will be described in detail below, the memory management unit 280 also issues translation lookaside buffer (TLB) flush indicators to appropriate ones of the accelerator devices 290.

As will be described below, the use of the separate, non-shared page tables 240-1 . . . N, 270-1 . . . N has many benefits. For example, separate, non-shared page tables 240-1 . . . N, 270-1 . . . N can be used with accelerator devices that may require page table to be in a different format than that used by the main OS. The mechanism requires little or no modifications to the main OS, assuming that the OS kernel 220 already provides a programming interface to pin memory in place.

Figure 3:
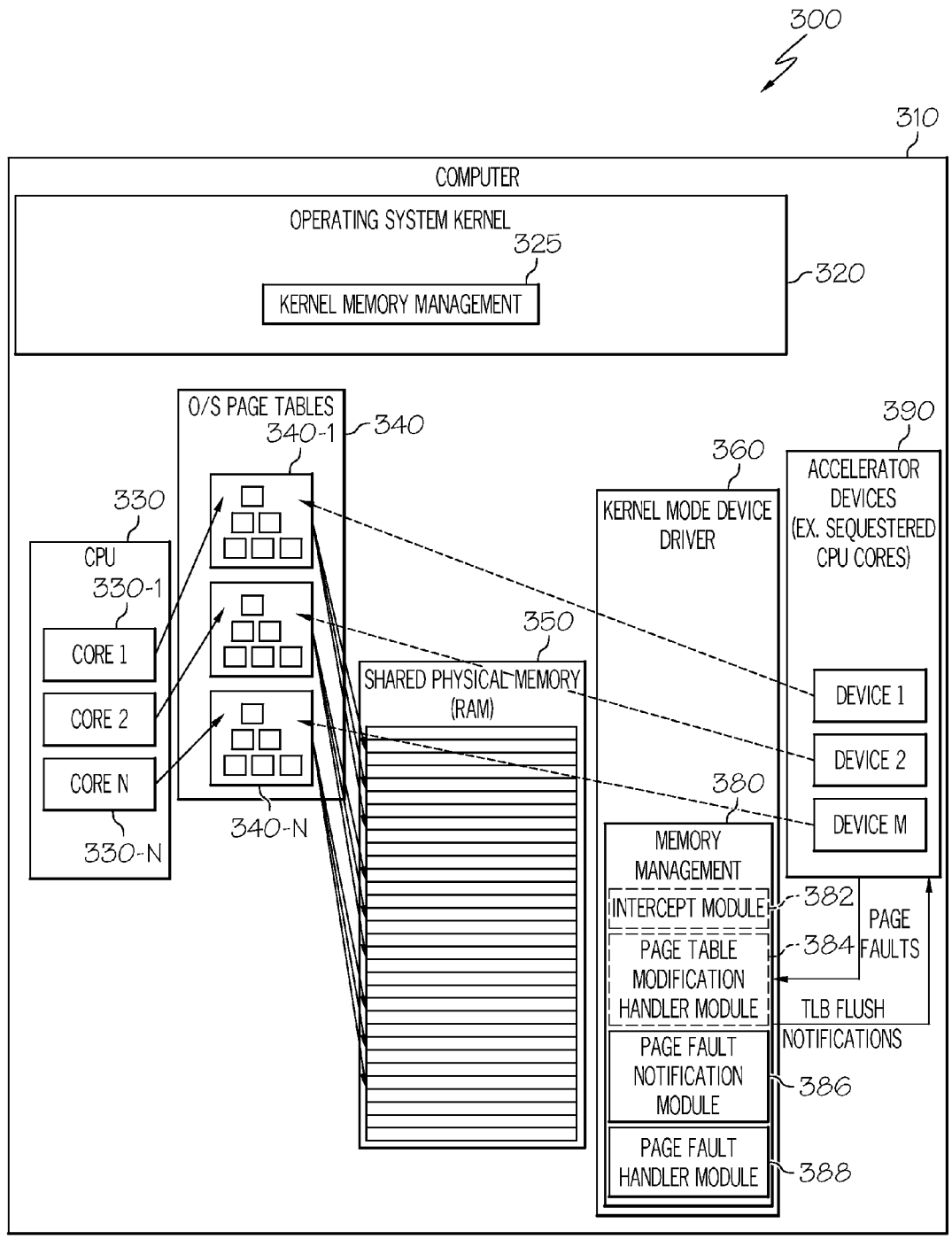
FIG. 3 is a block diagram of a computer system and a plurality of accelerator devices in accordance with some of the other disclosed embodiments.

FIG. 3 is a block diagram of a computer system 310 and a plurality of accelerator devices 390 in accordance with some of the other disclosed embodiments. The system 310 is similar to the computer system 210 in FIG. 2 in that it also includes a shared physical memory 350 that operates in accordance with virtual memory (VM) address translation techniques. However, in this embodiment, as will be described below with reference to FIGS. 6 through 8, OS page tables are "shared by" the computer system's 210 operating system kernel 320 and the accelerator devices 390. Each of the accelerator devices 390-1 . . . M can be associated with one or more of the OS page tables 340. As such, the page tables of this embodiment will be referred to herein as "shared" page tables.

As with FIG. 2, the computer system 310 includes an operating system kernel 320, a plurality of CPU processor core devices 330-1 . . . N, a kernel mode device driver (KMDD) 360 (referred to below simply as a device driver 360 or driver 360) for the various accelerator devices 390, and a shared physical memory 350 (e.g., RAM) that operates in accordance with virtual memory (VM) address translation techniques. Operation of the computer system's operating system kernel 320, the device driver 360 and the accelerator devices 390 will be described below with reference to FIGS. 5 and 7.

When a process requests access to its shared physical memory 350, it is the responsibility of the OS kernel 320 to map the virtual memory address provided by the process to the physical memory address where that memory is stored. The OS stores its mappings of virtual memory addresses to physical memory addresses in a page table. The operating system kernel 320 creates and maintains a plurality of OS page tables 340-1 ... N. The shared physical memory 350 that includes a plurality of pages (designated by rows of a column in this exemplary illustration). Although FIG. 3 illustrates one exemplary embodiment where the page tables 340-1 ... N are created and maintained via the main OS kernel 320, in other embodiments, the page tables 340-1 ... N can be created and maintained by the driver 360.

Each of the CPU processor cores 330 can be associated with a corresponding one of the OS page tables 340-1 ... N (as indicated by the arrows linking particular ones of the CPU processor cores 330 with corresponding ones of the OS page tables 340-1 ... N). Each of the OS page tables 340-1 ... N include a plurality of page table entries (not shown) that are each mapped to particular locations in the shared physical memory 350 as indicated by the arrows linking a particular one of the OS page tables 340-1 ... N with locations at the shared physical memory 350.

The page tables 340-1 ... N are each associated with corresponding locations in the shared physical memory 350 as indicated by the arrows linking the page tables 340-1 ... N with corresponding locations in the shared physical memory 350.

In this embodiment, the accelerator devices 390-1 ... M can each be associated with one or more of the page tables 340-1 ... N, and the OS page tables 340-1 ... N are used by the various accelerator devices 390 for virtual memory address translation. In this sense, the page tables 340-1 ... N are "shared" by the accelerator devices 390 and the operating system kernel 320 (i.e., the same set of page tables 340-1 ... N are utilized at the operating system kernel 320 and the accelerator devices 390). Thus, in this embodiment, because the page tables 340-1 ... N are shared with accelerator devices 390, the page tables 340-1 ... N, will be referred to as "shared" page tables to distinguish them from "non-shared" page tables that are be described above with reference to FIG. 2. The shared OS page tables 340 are created, maintained and utilized by the operating system kernel 320 by operating in conjunction with the accelerator devices 390. In other words, the page tables 340 are used by the various accelerator devices 390, but not exclusively.

As in FIG. 2, the driver 360 also includes an independent memory management unit 380 (i.e., that is independent of the main MMU of the main OS kernel 320). that provides a memory management function for the accelerator devices 390. The MMU 380 includes an intercept module 382, a page table modification handler module 384, a page fault notification module 386 receives page fault notifications (e.g., when the accelerator device 390 tries to access virtual memory area that is not currently in physical memory) and a page fault handler module 388 that handles the page fault notifications. These modules will be described in detail below. The driver 360 also handles page table related tasks, and issues translation lookaside buffer (TLB) flush indicators to appropriate ones of the accelerator devices 390.

As will be described below, the use of the shared page tables 340-1 ... N also has many benefits including potentially better performance, easier and cleaner implementation, and the ability to leverage OS memory management code.

FIGS. 4A-4E are flowcharts illustrating a memory sharing method 400 that uses separate, non-shared page tables at an accelerator device to share physical memory that is managed by a main OS kernel 220 in accordance with some of the disclosed embodiments. The method 400 can be used in environments where an accelerator device supports page tables.

In one implementation of this method 400 that will be described below, the memory sharing memory mechanism will be implemented at a device driver (e.g., the KMDD 260 of FIG. 2). Although the memory sharing method 400 will be described below as being implemented in a device driver 260, it is noted that a similar implementation can be provided directly in the main OS kernel 220 to handle memory sharing with accelerator devices. This implementation of the memory sharing method 400 is useful in OS environments such as Microsoft Windows where the OS kernel is closed source and can not be changed or modified by a third party and therefore cannot support shared page table operations. The driver 260 can create/maintain its own copy of page tables since Windows OS kernel does not provide an interface for applications or device drivers to directly manipulate the page tables for an arbitrary process.

The method 400 begins at step 405, where the driver 260 creates (and eventually maintains) a set of separate, non-shared page tables 270 for exclusive use by accelerator device 290. The driver 260 creates a non-shared page table 270 for each process using the accelerator device 290. Each non-shared page table 270 is for exclusive use by the accelerator device 290 for which it is created. The set of separate non-shared page tables 270 correspond to the page tables 240 created and maintained by the main OS kernel 220. In one implementation, the accelerator device 290 initially starts with an empty page table 270 so any attempt to translate virtual to physical memory address should cause a page fault. Alternatively, the device driver 260 may pre-populate the page table 270 with some translation entries that may be known in advance.

The trigger event for creating the page tables 270 varies depending on the implementation. In one implementation, the driver 260 can create the tables 270 when a process (e.g., user process or system process) first uses the driver 260 (e.g., the process opens a driver handle). In another implementation, the driver 260 can create the tables 270 when the first work unit is scheduled by the process for the accelerator device. In other implementations, the driver 260 can create the tables 270 in response to some other driver specific event.

The format of the page tables 270 varies depending on the implementation. The page table 270 may use the same format as the page table 240 for the process, or it may use a different format as appropriate for the accelerator device 290. In any case, the page table format must take into account whether the process operates in a 32-bit or 64-bit address space and/or other system/device specific requirements.

At step 410, the driver 260 provides the address of the page table to the accelerator device. The implementation of step 410 varies depending on the specific type of accelerator device.

At step 415, the driver 260 monitors the OS and accelerator devices for specific events. In particular, the driver 260 continuously monitors the OS and accelerator devices to determine if the accelerator generated a page fault, if the process has released a block of memory back to the OS, or if the process has terminated or closed the last remaining driver handle. If any of these events occur, the driver 260 will handle the event as described in FIG. 4B (starting at step 440), FIG. 4C (starting at step 460) and FIG. 4D (starting at step 480).

Driver Receives a Page Fault from Accelerator Device

Figure 4A:
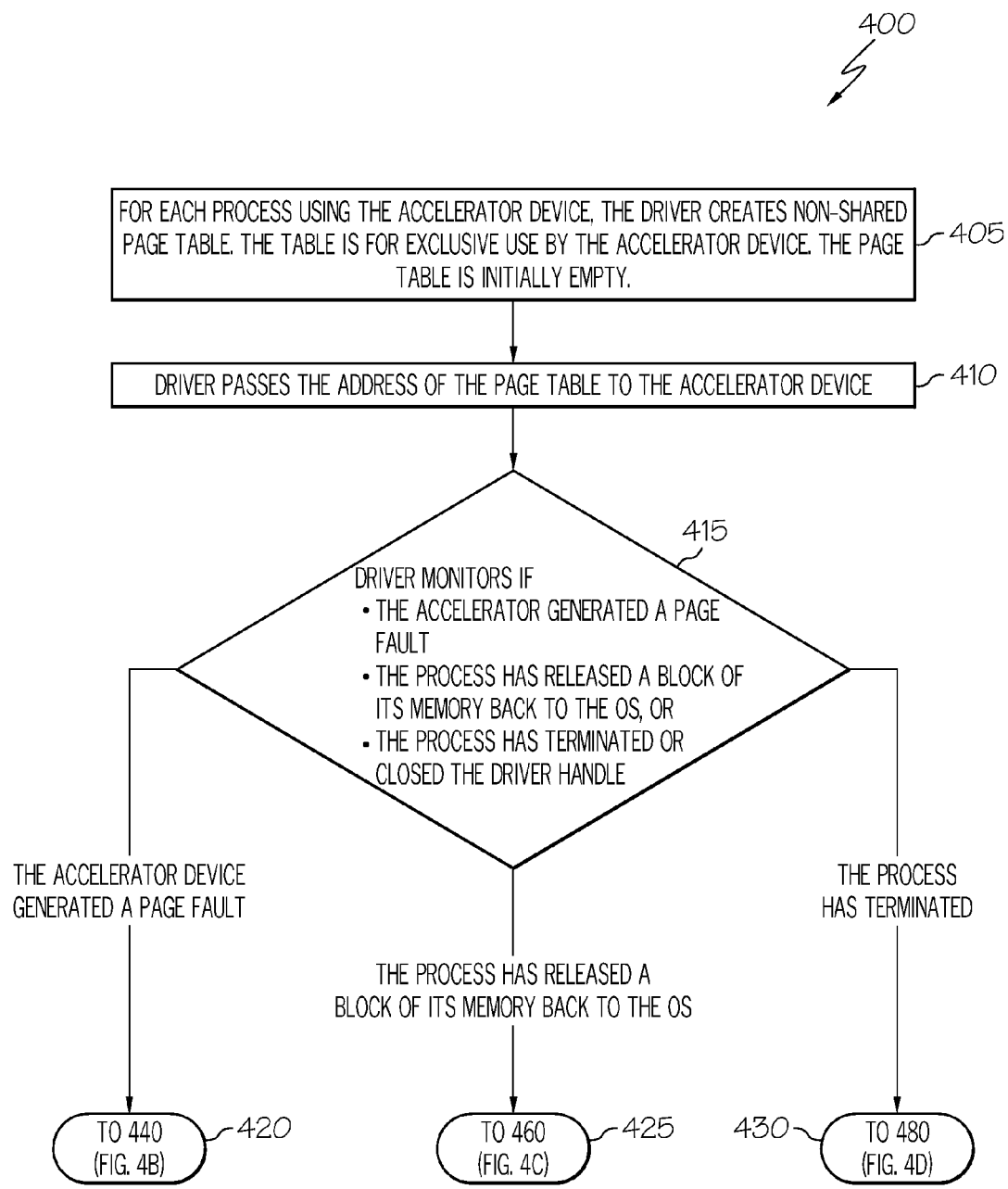
FIGS. 4A-4E are flowcharts illustrating a memory sharing method that uses separate, non-shared page tables at an accelerator device to share physical memory that is managed by a main OS in accordance with some of the disclosed embodiments.
Figure 4B:
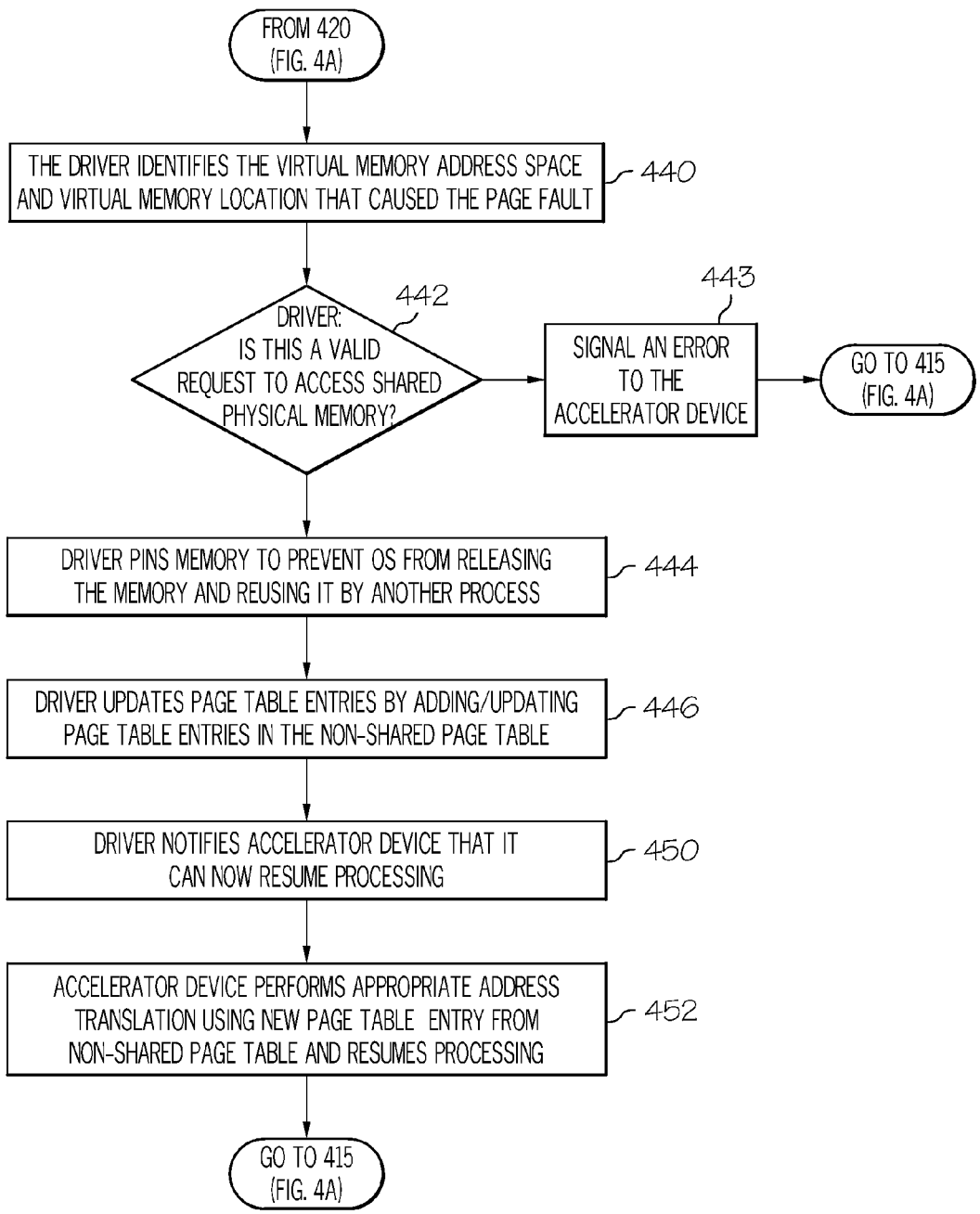

When the driver 260 determines that the accelerator device 290 has generated a page fault, the method 400 proceeds as illustrated in FIG. 4B. FIG. 4B is a flowchart illustrating a method for handling a page fault at a driver in accordance with one exemplary implementation of the disclosed embodiments.

Examples of Conditions/Events that Trigger a Page Fault at the Accelerator Device A number of different error conditions and/or device specific events can cause the accelerator device 290 to generate a page fault. Prior to describing FIG. 4B some examples of such error conditions and/or device specific events will now be described.

For instance, the accelerator device 290 will generate a page fault and send it to the driver 260 when the accelerator device 290 is unable to find an address translation entry in the TLB or page table, or when the translation entry has insufficient access rights. In any of these scenarios, the accelerator device 290 suspends processing of the current work unit and sends the page fault information to the driver 260 to notify the driver that there is a page fault. To explain further, when the accelerator device 290 tries to access the process memory, the accelerator device 290 (or other hardware (like IOMMU) that will translate memory accesses on-the-fly) will attempt to translate the process virtual memory address to a physical memory address in shared physical memory 250. The accelerator device will first check the TLB, and if no translation entry is available, it will then try to obtain one using the page table. If accelerator device 290 attempts to access this physical memory address and the page table does not contain an appropriate/correct address translation entry (i.e., needed to translate the virtual memory address to the physical memory address), the device stops processing. The accelerator device is unable to continue working on the current work unit until it can access the memory location and will therefore generate a page fault. In other words, if the page table is empty, or does not contain an virtual address translation entry, a page fault will occur (in the internal mechanism of the accelerator device 290). A page fault should also occur if the accelerator device 290 is trying to perform a memory access that is not currently allowed by the page table (e.g., trying to write to a read-only page or execute page with NX bit set).

Regardless of the trigger event or condition, the accelerator device communicates the page fault information to the driver. The details of how the page fault information is propagated are device specific and vary depending on the type of device. For instance, in some implementations, the accelerator device 290 may use an external interrupt, in other implementations it may use a message queue, in other implementations it may use a combination of both, and in other implementations it may use some other mechanism. In some implementations, the accelerator device will suspend processing of its current work unit upon generating a page fault. In other implementations, the accelerator device 290 may chose to execute another work unit (for the same or other process) while the current page fault is serviced by the driver 260. In some implementations, the accelerator device 290 may chose to stop all processing until the driver finishes servicing the current page fault.

Referring again to FIG. 4B, when the driver 260 receives page fault information from the accelerator device, at step 440 the driver 260 identifies memory address space (owner process) and location of the address in the virtual memory. (The memory address space and location are the space and location specified in the memory access request that caused the page fault.) The method 400 then proceeds to step 442, where the driver 260 determines whether the request for access to shared physical memory is valid (i.e., verifies whether the memory access request that triggered the page fault was legitimate). One exemplary implementation of step 442 will be described below with reference to FIG. 4E.

When the request for access to shared physical memory is determined to be invalid at step 442, or cannot be granted for any other reason, the method 400 proceeds to step 443, where the driver 260 sends an error signal to the accelerator device 290 to indicate that the page fault could not be successfully handled. In one implementation, the driver could signal the error to the accelerator device 290 via an inter-processor interrupt (IPI) or a VMMCALL (if a hypervisor is used to control sequestered CPU processor cores). In case of other hardware accelerator devices, the driver 260 could write the error information to a device specific hardware register or use some other device specific mechanism.

Upon receiving the error signal, the accelerator device can no longer continue executing the work unit. What happens next depends on the specific implementation and any steps taken are accelerator device specific. In one implementation, the accelerator device discards the work unit code/data and signals an error to the process that queued this work unit.

When the request for access to shared physical memory is determined to be valid at step 442, the method proceeds to step 444, where the driver pins memory to prevent the OS from releasing the memory and thus prevent it from being reused by another process. To explain further, the driver must add a virtual to physical memory mapping to the page table for use by the accelerator device, but before it can do that, the driver must first ensure that the virtual memory is mapped to physical memory page, and pin it to ensure that the OS will not release the physical memory and reuse it for some other task. In order to ensure system stability and performance, the driver 260 (or the OS) must limit how much memory can be pinned for use by the accelerator device 290 at any given time. This imposes size limits on both the pinned memory containing process code/data and the pinned memory used to store the page table (the device page table is typically stored in physical, continuous memory). To control the amount of pinned memory, one possible implementation of step 444 will be described below with reference to FIG. 8.

The method 400 then proceeds to step 446, where the driver 260 updates the non-shared page table used by the accelerator device by adding/updating an appropriate page table entry (or entries) in the non-shared page table 270 for the memory page(s) being used by the accelerator device.

As a performance optimization technique, the driver 260 may decide to preemptively pin and map in the page table add more than one page at a time. For example, the driver 260 could predict ahead of time, what is the next address that the accelerator device 290 is likely to access, and pin that address at the same time it handles the page fault for another address.

At step 450, the driver 260 notifies the accelerator device 290 that the page fault has been successfully handled and notifies the accelerator device that it can now resume processing and execution of the work unit. This notification can be done via many different mechanisms, including an IPI, IO register access, message queues, etc. If the accelerator device has been executing another work unit while waiting for the page fault to be handled, it may decide to first complete the other work unit, before it actually resumes the work unit that caused the page fault. Other accelerator devices may decide to resume the execution of the faulting work unit immediately. Other accelerator devices may use another mechanism.

Regardless of the mechanism used, the method 400 eventually proceeds to step 452 where the accelerator device 290 performs virtual address translation using the newly added/updated translation entry (or entries) from non-shared page table 270, and resumes processing until next page fault occurs. At this point the driver proceeds back to step 415.

Process Releases Memory Block

At any time the process may decide to release a block of its memory back to the OS. This memory will no longer be used by the process, and should no longer be accessible to the accelerator devices. As such, the driver 260 must ensure that corresponding page table entries are removed from the page table and accelerator device 290 TLB tables. In one implementation of step 415, when the process releases a block of its memory back to the OS, the driver 260 intercepts an API call to release memory. The exact mechanism will be OS specific. For example, in one implementation, the device driver 260 may install a function hook that will be called by the OS automatically when the process invokes an API to release a block of memory back to the OS.

Figure 4C:
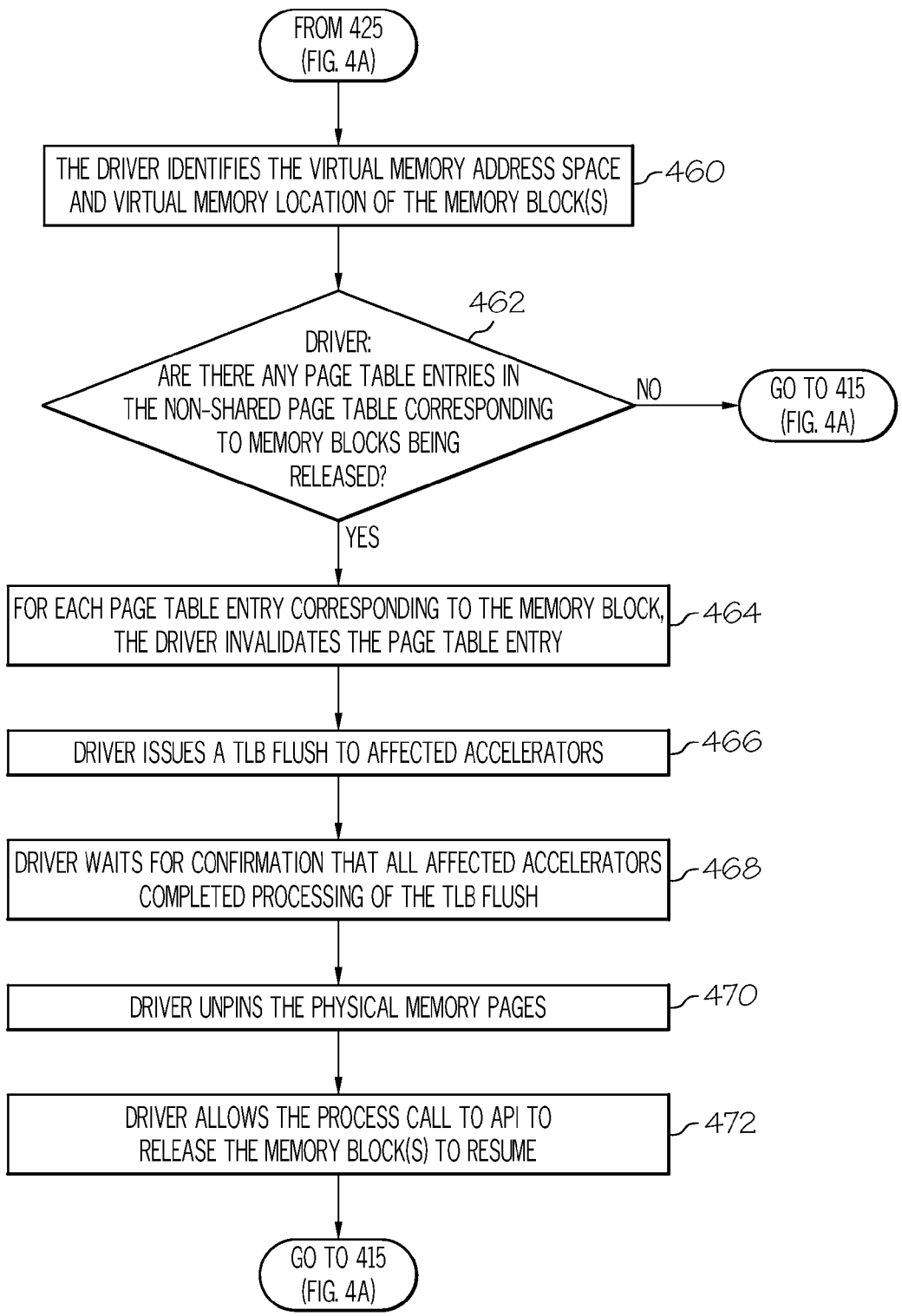
Figure 4D:
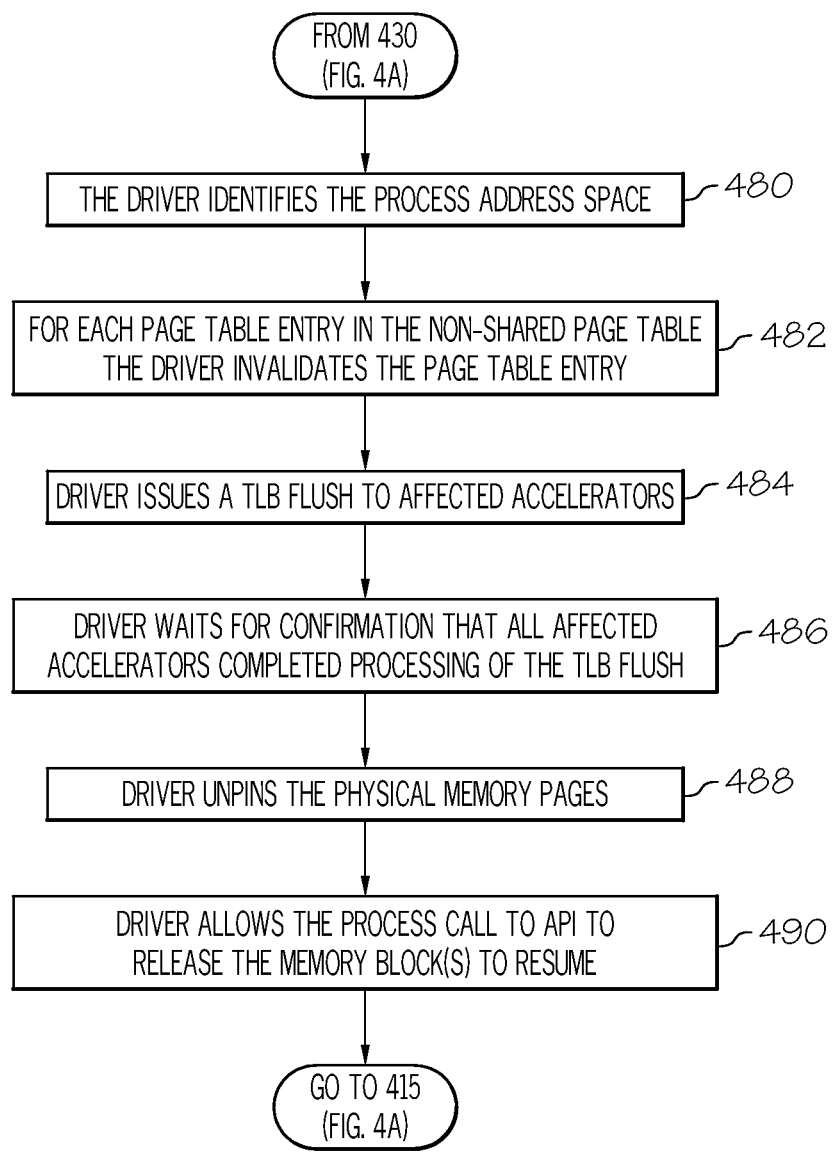

Referring again to FIG. 4A, when the driver 260 determines at step 415 that the process has released a block of its memory back to the OS, the method 400 proceeds to FIG. 4C. FIG. 4C is a flowchart illustrating a method performed by the driver for removing page table entries when a process releases a block of memory. At step 460, the driver 260 identifies the memory address space and virtual memory location of the process that contains a virtual memory address specified in the page fault notification from the accelerator device.

At step 462, the driver then determines if any entries in the non-shared page table correspond to memory blocks being released. To do so, the driver will determine if the memory block being released is accessible to the accelerator device via non-shared page table. If no entries in the non-shared page table correspond to the memory block(s) being released, the method 400 can proceed back to step 415 and continue to monitor for other events.

If there are entries in the non-shared page table that correspond to memory block(s) being released (i.e., the memory block(s) being released is/are accessible to the accelerator device via non-shared page table), the method proceeds to step 464 where the driver 260 identifies each memory page that corresponds to the memory block being released (i.e., that is mapped in the accelerator device page table), and invalidates each page table entry corresponding to the memory block being released. The driver 260 invalidates the corresponding page table entries to ensure that the corresponding memory blocks no longer use by the accelerator device and that the accelerator devices can no longer use corresponding memory pages.

Since the accelerator device 290 may have cached some of the address translation entries from the page table (and thus have a cached view of the address translation entries), at step 466 the driver 260 also issues a TLB flush signal to all potentially affected accelerator devices to flush their TLBs. The exact mechanism used to send the TLB flush signal to the accelerator device is specific to the type of accelerator device. For example the driver may write to a driver specific register, or in case of X86 sequestered CPU core, the driver may issue a VMMCALL instruction. In response to the TLB flush, each accelerator device must determine if its TLB table contains any address translation entries corresponding to the page table entries that were invalidated. If so, the affected accelerator devices must delete such entries from their respective TLB tables. Finally, the potentially affected accelerator devices must signal the driver that they have finished handling the TLB flush operation.

At step 468, the driver 260 waits for the potentially affected accelerator devices 290 to signal that they have processed the TLB flush signal and completed handling the TLB flush operation. The driver must wait for all affected accelerator devices to send a confirmation signal. The exact mechanism is accelerator device specific. For example the accelerator device may signal an interrupt to the CPU, or set a bit in one of its status registers. Only after all accelerator devices have signaled that they have completed the TLB flush handling can the driver assume that the memory is no longer used by any accelerator device and that the affected memory pages can be safely unpinned.

At step 470, the driver 260 will unpin all physical memory pages that were released by the process. After the affected memory pages have been unpinned, at step 472, the driver 260 will allow the process call (to release a memory block) to resume and complete. At that point the physical memory is freed and can be reused for other tasks. The driver then proceeds back to step 415.

Process Termination

Referring again to FIG. 4A, at step 415, the driver can determine if the process has terminated. For example, the driver can determine if the process has terminated using an OS specific mechanism, or alternatively can be notified that the process has terminated when the process no longer uses the accelerator devices and closes the last open driver handle. When the driver 260 determines that the process has terminated at step 415, the method 400 proceeds to FIG. 4D, where the driver performs steps to unpin any physical memory pages corresponding to the process virtual memory address space.

At step 480 the driver identifies the process address space (e.g., address space of the user process) corresponding to memory pages that are to be unpinned. To ensure cache coherency, the driver invalidates the page table entries (step 482), and issues a TLB flush to affected accelerator devices (step 484). The driver then waits (step 486) for confirmation from all affected accelerator devices that they have completed processing of the TLB flush. The affected accelerator devices will signal that they have removed the page table entries from their TLB tables. At step 488, the driver unpins the physical memory pages. At step 490, the driver 260 will allow the process call (to API to release a memory block) to resume and complete. At that point the memory is freed and can be reused for other tasks. The driver 260 then proceeds back to step 415.

Is the Memory Access Request by Accelerator Device Valid?

Figure 4E:
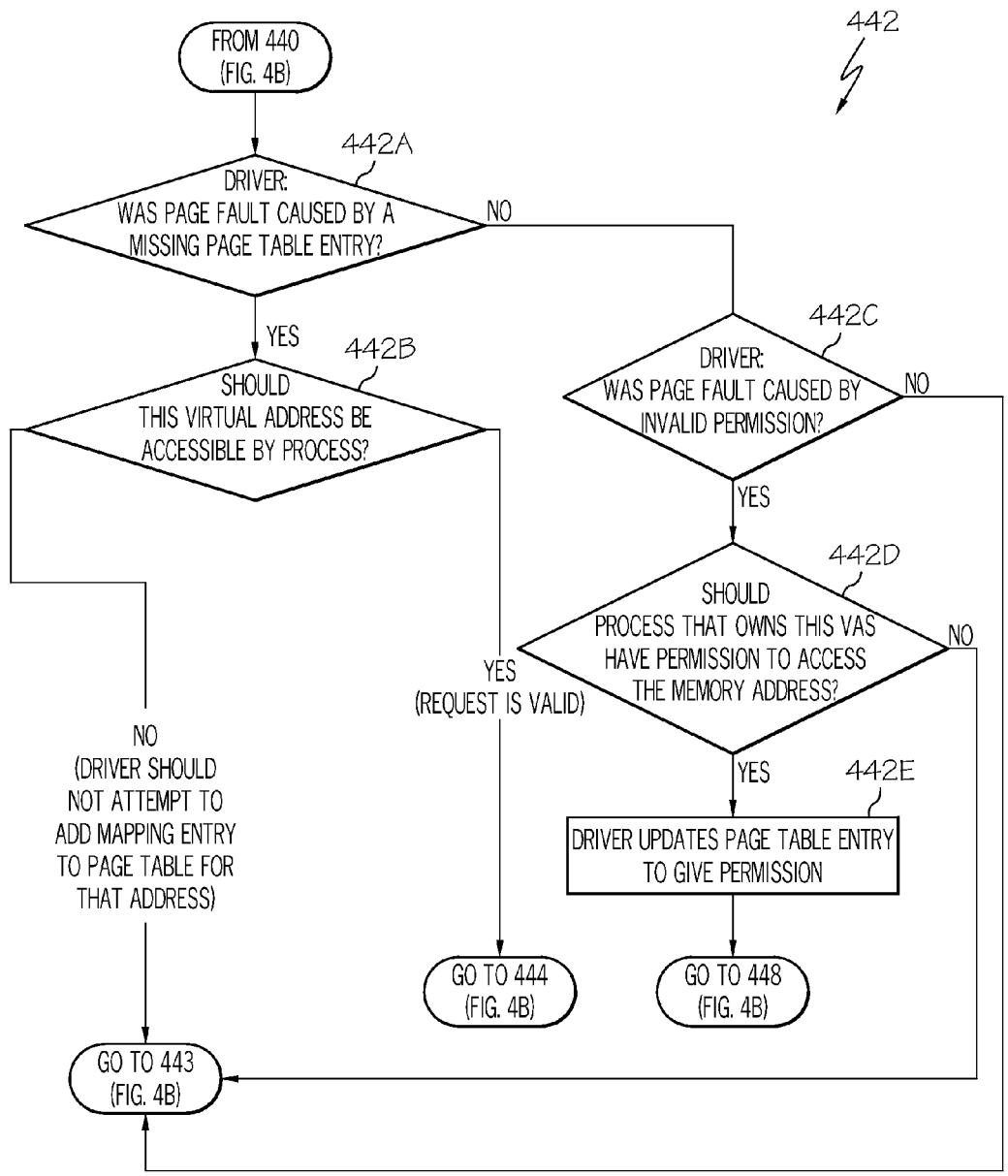

As described above at step 442 of FIG. 4B, the driver determines whether the memory access request that triggered the page fault is valid/legitimate. FIG. 4E illustrates one exemplary implementation of a method 442 performed by the driver 260 for determining whether a memory access request (from the accelerator device for access to shared physical memory) is valid/legitimate. Because separate (non-shared) page tables are utilized, the OS kernel 220 is not aware of the separate set of page tables. As such, in this embodiment, the driver performs additional steps of method 442 to determine if the accelerator device should have specific security permissions to access the faulting memory location(s).

At step 442A, the driver 260 determines if the page fault was caused by a missing page table entry. In this context, a missing page table entry can mean that there was no page table entry and that the accelerator device was unable to translate the process virtual memory address to physical memory address.

If it is determined (at step 442A) that the page fault was caused by the missing page table entry (i.e., the page table did not have the specific page table entry), at step 442B the driver must determine if the accelerator device should be allowed to access the specific virtual memory with desired access privileges. In other words, at step 442B, the driver determines whether the accelerator device has the permission to access (read/write/execute) the memory location at the specified virtual memory address. The exact mechanism will be OS and hardware specific, but typically the driver will use OS services to determine if the process can legally access the memory location in the specific manner. If it is determined (at step 442B) that the request is valid and that the virtual memory address should be accessible to the process, then the method 400 proceeds to step 444. Specifically, if the driver determines that the accelerator device can be granted the memory access, it proceeds to step 444 to update the page table.

If it is determined (at step 442B) that the request is invalid (i.e., that the virtual memory address should not be accessible to the process), then the method 400 proceeds to step 443 to signal an error to the accelerator device (as described above). In other words, if at step 442B the driver determines that the accelerator device should not be granted the specific memory access (e.g., the accelerator may be trying to write to a read-only memory block), the driver should not attempt to add a mapping entry to the page table for that address and should instead proceed to step 443 to signal an error to the accelerator device.

If it is determined (at step 442A) that the page fault was not caused by a missing page table entry (i.e., the page table did contain a specific page table entry), then the method 400 proceeds to step 442C. At step 442C the driver determines if the page fault has occurred because the accelerator device did not have valid/sufficient permission to access the memory. In other words, the driver determines whether the page fault was caused by attempt to access memory with insufficient access permission (e.g., writing to a memory page marked as read-only). If the driver determines that the page fault was not caused by an invalid/insufficient permission attempt at step 442C, then it proceeds to step 443 where the driver signals an error to the accelerator device (as described above). If the driver determines that the page fault has occurred due to invalid/insufficient permission attempt, the method proceeds to step 442D, where the driver determines whether the process that owns this VMAS should have the permission to access the memory address. In other words, if the driver determines that the accelerator device has caused a page fault due to invalid/insufficient access permissions, then at step 442D the driver must decide if the process that owns the VMAS has the desired permissions to access the specified memory address/location. This can be done via OS specific mechanism. If the OS decides that the process that owns this VMAS does not have the desired permission to access the memory address (at step 442D), the accelerator device should operate under the same restrictions, and the method 400 proceeds to step 443 to signal an error to the accelerator device (as described above).

If the driver determines (at step 442D) that the process that owns this VMAS should have the desired permission to access the memory address (for example the accelerator device is trying to write to a memory location that is currently marked as read-only, but the OS agreed to grant read-write access to the memory), then the method 440 proceeds to step 442E. At step 442E, the driver updates the corresponding page table entry to indicate the new permission/access rights and thus give necessary permission to the process to access the memory address. The method 400 then proceeds to step 448 (described above).

Windows OS Implementation Details

To implement the method 400 in a MS Windows environment, other implementation details will now be described.

One implementation detail relates to the method of pinning the memory of arbitrary process. Although Windows provides a programming interface to pin process virtual memory, the interface functions must be invoked in the context of the process. If the memory must be pinned in response to an interrupt (which can occur in the context of arbitrary process) this is not easy to guarantee. To do so, in one embodiment, the driver 260 used a PsCreateSystemThread function to create a system worker thread that belongs to a specific process; the driver 260 can create an instance of that system worker thread when the process accesses the driver 260 for the first time (open handle). Because it is a system thread, it has access to the kernel programming interface, and because it belonged to the process, it was guaranteed to execute in the process context. When a page fault occurs, the driver 260 would identify the process that owned the specific address space and then resumes the system worker thread. The thread would then proceed to pin the memory as required (or unpin the memory when invalidating a page table entry).

Another implementation detail relates to the method for handling processes that would try to dynamically allocate the memory for use by the accelerator device. If the process allocated the memory, scheduled a work unit and the accelerator device tried to access the memory, the device driver 260 would try to pin the memory and add corresponding entry to the page table. If the process later released the memory without notifying the driver 260, the driver 260 would not be aware of that and the page table entry (in the driver maintained page table) would become stale. Further, the OS may have assigned that physical memory to another process, which could result in the accelerator device accessing wrong memory in the wrong process. To prevent this, the driver can add hooks to intercept many memory management functions provided by the main OS (in particular all function used to allocate and release memory).

FIGS. 5A-5D are flowcharts illustrating a memory sharing method 500 that uses shared OS page tables at an accelerator device to share physical memory that is managed by a main OS kernel 320 when the accelerator device supports page tables in accordance with some of the disclosed embodiments.

The method 500 can be implemented in the main OS kernel 320 or via the driver 360 (i.e., the KMDD 360 which can be referred to below simply as "driver" 360). In one implementation of this method 500 that will be described below, the memory sharing memory mechanism will be implemented at the driver 360. This implementation of the memory sharing mechanism is useful in OS environments that provide necessary access to OS page table mechanism, or OS environments such as Linux where the kernel is open source and can be changed or modified by a third party and the access to OS page table mechanism can be added. Thus, the disclosed embodiments can be applied, for example, in conjunction with open-source OS environments (e.g., Linux or OS environments other than the Microsoft Windows OS). To do so, additional API are provided. In this embodiment, the driver 360 does not need to create/maintain its own copy of page tables since the OS kernel 320 (e.g., Linux kernel) can be modified to provide an interface for applications or device drivers to directly manipulate the page tables for arbitrary process. Instead, in this embodiment, the page tables can be "shared" between the main OS kernel 320 and an accelerator device 390. In this implementation, the device driver 360 can rely on the OS kernel 320 for the memory management, and the OS kernel 320 can take full advantage of any advanced techniques to maintain the process page tables. As a result, the driver 360 code becomes much simpler than in the separate page tables approach described above with respect to FIG. 4A.

The method 500 begins at step 505, when the device driver 360 determines that it has shared access to OS page tables 340 for memory management. As described above, these shared OS page tables 340 are compatible with the accelerator device (e.g., contain all the required information for the driver to perform address translation entry lookup and provide the address translation entries to the accelerator).

If the accelerator device 390 does not support shared OS page tables 340, then the separate non-shared page tables 240 maintained by the OS kernel 320 and driver 360 are utilized as described above with reference to FIGS. 4A-4E. It is noted that using the same page tables in a shared manner is possible only if the accelerator device supports page tables having a compatible format with the page tables 340 (so that the CPU can work with that format) and provides other guarantees (like updating the dirty/accessed bits on page table entries). In some implementations, the page table format used by the accelerator may be identical to the format used by the CPU or a superset of the format used by the CPU.

Driver Intercept Module for Intercepting OS Modifications to Page Table Entries

The OS kernel 320 may invalidate a virtual memory page of a user process at any time without any notice. This can happen, for example, if there are multiple processes competing for the same limited resources (physical memory) in which case the OS may suspend one of them, allocate the memory to the other process, let it compute for a while, then preempt it, assign the memory back to the first process and allow it to resume. Since the OS controls the mappings from virtual to physical memory, and can suspend/resume a user process at any time most user processes are not aware of this (i.e., the whole action is mostly transparent from their point of view.) If the OS kernel 320 decides to release a physical memory page (for example to assign it to another process), it will invalidate the page table entry.

One difficulty with sharing the page tables between the main OS kernel 320 and the accelerator device is to ensure TLB cache coherency. The accelerator device can maintain a cached view of the page table translation entries. If the main OS kernel 320 invalidates some/all page table entries, the cached view may become stale. The driver 360 must prevent this from happening, as it could result in memory corruption. The OS may chose to invalidate a page at any time, regardless of what a given process did or did not do. Under normal circumstances, especially in multi-processor architectures, the main OS kernel 320 already has a mechanism to ensure cache coherency because each CPU processor core may maintain its own cache (TLB table) of the translation entries.

As will be described below, before removing a memory page, the OS kernel 320 may issue a TLB flush (step 565) to other CPU processor cores (under the OS kernel 320 control) and wait (step 570) until they flush the corresponding TLB table entry before it removes the memory page (step 575). However, it is possible that the OS kernel 320 may not issue any TLB flush at all. This can happen if the OS kernel 320 thinks that no CPU processor core is currently executing any code from the process that owns the specific virtual memory address space. In such case there is no need to flush TLB cache, as that will happen automatically during the next context switch before the code from the specified process is executed again. This complicates the work for the accelerator devices 390 (and the driver 360) because the accelerator device may in fact be executing code/data of a process without any knowledge of the main OS kernel 320. The main OS kernel 320 may therefore decide to remove/invalidate a page table entry and the TLB cache in the accelerator will become stale. Simply intercepting TLB flushes from the main OS kernel 320 is not sufficient to solve this problem.

As will be described below, when implementing shared page tables in conjunction with driver 360, the driver 360 will have to perform specific actions in response to the OS modifications to page table entries (perhaps immediately before or immediately after the modifications are made). To allow this to happen, method 500 requires that the OS provide a mechanism to intercept OS modifications to page table entries. To address this issue, an intercept module is provided at the driver 360 to intercept any OS changes to page table entries and alert the driver 360 whenever any page table entries are being modified by the main OS kernel 320.

Thus, at step 509, the driver 360 installs an intercept module with hooks for notifying the driver 360 whenever the OS kernel 320 changes/modifies (e.g., invalidates) a page table entry. The driver 360 will be notified whenever the OS makes any changes to a page table entry including: "positive" changes (e.g., when a new page table entry or new permissions are added), and "negative" changes (e.g., when a page table entry is invalidated or when permissions are removed). In some accelerator device implementations, the driver may only need to take action on negative changes. This way, whenever the OS kernel 320 decides to modify/invalidate a page table entry (as will be described below at step 560), the driver 360 will intercept the change to the page table entry. This will happen regardless of whether the OS kernel 320 thinks that this is in the context of a running or inactive process.

If the OS kernel 320 does not already provide a programming interface to perform such intercept, the OS kernel 320 kernel can be modified. For example, when the method 500 is implemented in a Linux environment, the Linux kernel can be modified to include the intercept module to notify the driver 360 of any changes to the page tables. For example, a callback mechanism can be added in the flush_tlb_current_task, flush_tlb_mm, flush_tlb_page and flush-tlb_all functions that are invoked by the Linux kernel whenever it makes page table entries and needs to decide if a TLB flush is required to alert other CPU processor cores. This callback mechanism might not be applicable if the kernel was built without support for multiple processors. In this case, a different implementation of the intercept module is required.

Creation of Shared Page Tables at OS

Figure 5A:
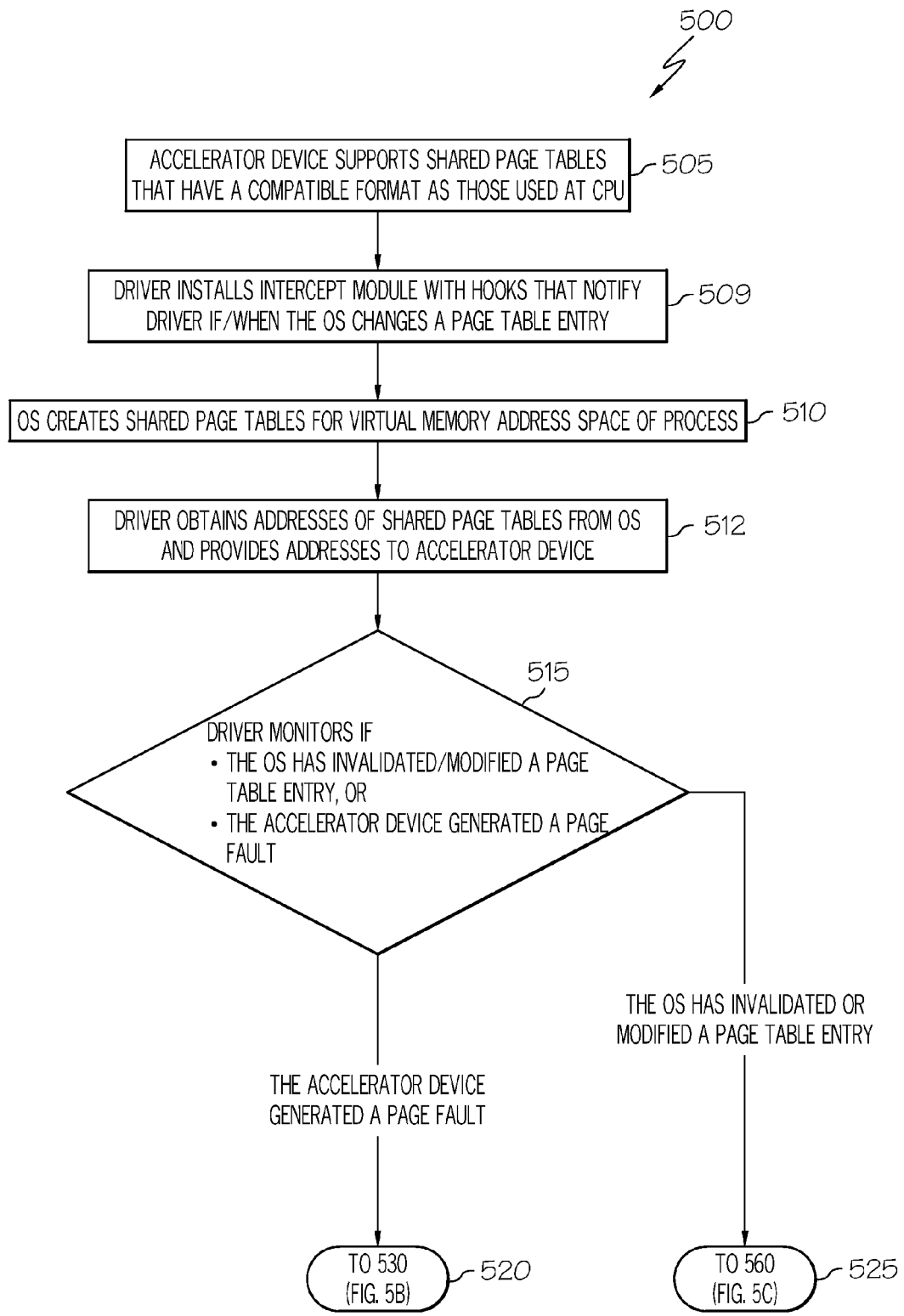
FIGS. 5A-5D are flowcharts illustrating a memory sharing method that uses shared OS page tables at an accelerator device to share physical memory that is managed by a main OS when the accelerator device supports page tables in accordance with some of the disclosed embodiments.

The OS kernel 320 creates page tables for any processes running under its control when the process is created. Thus, at step 510, the OS creates shared page tables for the VMAS of the process when it creates the process. The driver assumes that the OS kernel 320 has already created the shared OS page tables 340 for use by the process. Although FIG. 5A illustrates that step 509 occurs before step 510, intercept module can be installed before the process is created, when the process is created or after the process is created. However, the intercept module must be installed before the accelerator device tries to use the process' VMAS.

In this implementation, the driver 360 directly uses shared OS page tables 340 that have a compatible format with the main OS page tables 340 used at the CPU processor cores 330. In other words, the same page tables 340 that are created and maintained by the OS kernel 320 for the process are shared between the main CPU processor cores 330 (which under control of the main OS kernel 320) and the accelerator devices 390. As will be described below, when the accelerator device 390 needs to access a memory block in process VMAS, it simply uses the shared page table to translate the process virtual memory address to a system physical memory address.

It is noted that the accelerator device 390 is not allowed to modify shared page table 340 and remove entries, but it may update the dirty/other bits as required in the page table 340 format specifications.

Addresses of Shared OS Page Tables Provided to Accelerator Device

The method 500 proceeds to step 512, where the driver 360 obtains addresses of shared OS page tables 340 from the OS kernel 320 and provides addresses of shared OS page tables 340 to accelerator device 390. To obtain the address of the page table used by a given process the device driver 360 can invoke an OS specific function, or look up the data in OS specific data structures. Alternatively, the device driver 360 can simply look up the address of the page table in the CPU registers (the lookup code would have to run in the context of the process). Either of these techniques can be done when the process opens a handle to the driver 360, or when the first work unit is scheduled, or at any other convenient time.

Driver Monitors for Changes to Page Table Entries and/or Accelerator Device Page Faults At step 515 the driver 360 continuously monitors the system for two kinds of events: changes to the page table entries (e.g., when the OS invalidates a page table entry) and page faults generated by the accelerator device(s). The OS kernel 320 may choose to modify a page table entry (e.g., remove specific access permissions) or invalidate a page table entry and release a memory page from shared memory at any time. If the accelerator device signals a page fault, the method will proceed to step 530 (described in FIG. 5B). If a page table entry has been invalidated or modified, the method will proceed to step 560 (described in FIG. 5C).

Driver Action in Response to a Page Table Fault from Accelerator Devices

Figure 5B:
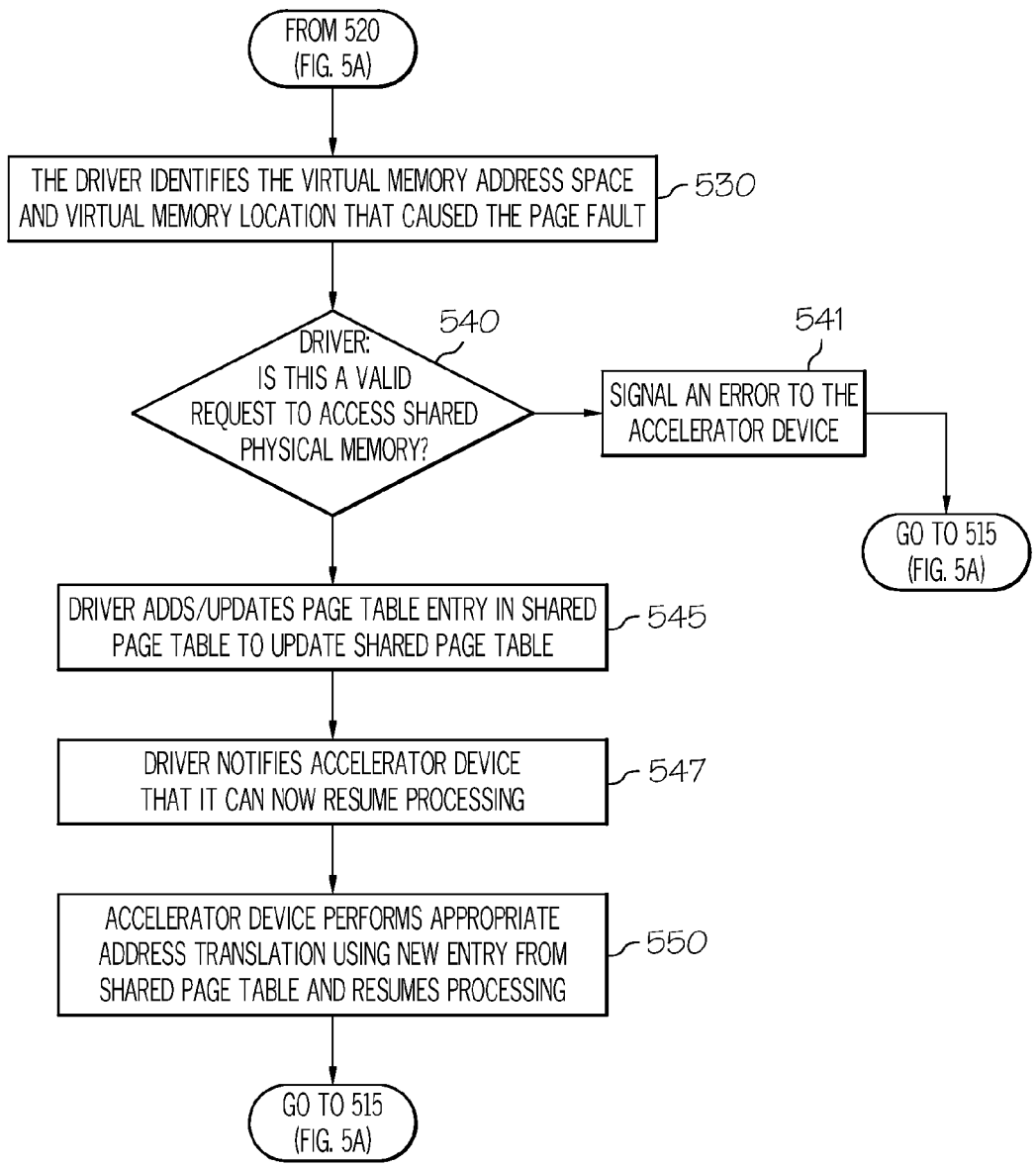

FIG. 5B is a flowchart illustrating a method for handling of a page fault from one of the accelerator devices at the driver 360 when the accelerator device shares a memory page table with the main OS.

Although not illustrated in FIG. 5B, when the accelerator device 390 attempts to access a memory address that does not have a corresponding address translation entry in the shared page table (or in its TLB cache), the accelerator device 390 generates an internal page fault. For example, if the accelerator device 390 tries to access a virtual memory page for which a page table entry does not exist in a shared page table (or in its TLB cache), or if the accelerator tries to access the memory in a manner that is not permitted by the page table entry, the accelerator device 390 generates a page fault. The accelerator device 390 suspends processing of the current work unit and a sends signal (e.g., an external interrupt or equivalent signal) to the OS kernel 320 which routes it to the driver 360 to notify the driver 360 of the page fault. The driver 360 recognizes it as a page fault will notify the memory management subsystem (i.e., MMU) of the kernel 320 of the page fault. The driver will then handle the page fault notification sent by the accelerator device as illustrated in FIG. 5B.

To do so, the driver 360 starts, at step 530, by identifying which memory address space and virtual memory location caused the page fault to identify the process that contains the faulting virtual memory address.

At step 540, the driver determines if the request for access to shared physical memory is a valid request. In short, the driver can determine if the process should have the permission to access the specified virtual memory address. In one implementation of step 540, the driver can invoke an appropriate OS API to determine if a request for access to shared physical memory is a valid request, and the main OS will make this determination on behalf of the driver. Thus, in one implementation of step 540, the OS kernel 320 will perform steps similar to those performed by the driver in FIG. 4E. Because the page tables are "shared," page table management code at the OS kernel 320 can perform these steps. The driver can use OS services/APIs to maintain the page tables, and those services/APIs can be used to perform steps equivalent to those in FIG. 4E. As such, the details of step 540 are not shown separately.

When the request for access to shared physical memory is determined to be invalid at step 540, the method 500 proceeds to step 541, where the driver 360 sends an error message or signal to the accelerator device 390 (e.g., via an IPI or some other device specific mechanism).

When the request for access to shared physical memory is determined to be valid at step 540, the OS needs to ensure that the virtual memory page is swapped into physical memory, and the page table needs to be updated. To do so, the method proceeds to step 545. At step 545, the driver 360 updates the shared page table 340 by adding/editing a page table entry in the shared page table 340. In one implementation of step 545, the driver can invoke an appropriate OS API to update the shared page table 340, and the main OS will add/edit the page table entry on behalf of the driver.

To explain further, when the driver 360 is notified about the page fault it must identify the process that contains the faulting virtual memory address. This is typically done in a device specific manner. Next the driver needs to handle the page fault in a similar way the OS would if it was a page fault caused by the CPU executing process instruction. To do so, the driver can implement step 545 in a number of different ways. For instance, in one implementation of step 545, the driver 360 attempts to access the same virtual memory page from a worker thread running in the context of the process that owns the virtual memory address space. In another implementation of step 545, the driver 360 simulates a page fault on the main OS as if it occurred by the process code. This could be done by simply injecting a page fault interrupt into a CPU processor core under the main OS control. In still another implementation of step 545, the driver 360 directly invokes the page fault handler code in the main OS. In another implementation of step 545, the driver 360 directly manipulates/updates the page tables as required. The driver 360 can then use an OS kernel function to resolve the fault.

At step 547, the driver 360 notifies the accelerator device 390 that is can now resume processing.

At step 550, the accelerator device 390 performs virtual address translation using the new page table entry from shared page table 340 and resumes processing until next page fault occurs. The accelerator device should also update the accessed bit in the page table to indicate that the memory has been used. If the access is for a memory write operation, the dirty bit needs to be updated as well to notify the OS that the memory has been modified.

Driver Action when OS Modifies/Invalidates a Page Table Entry

Figure 5C:
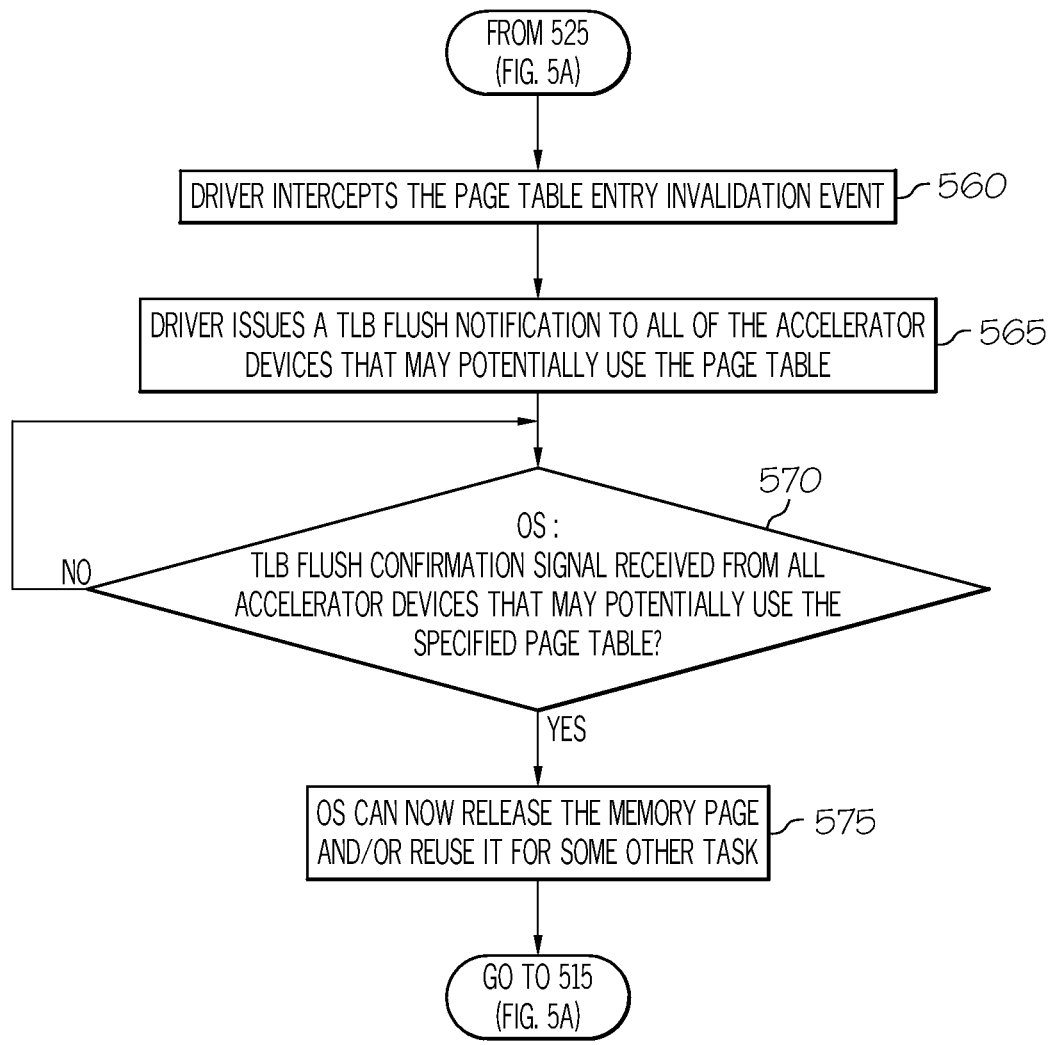

FIG. 5C is a flowchart illustrating a method performed at the driver 360 in response to the main OS kernel 320 changing/invalidating a page table entry in accordance with the disclosed embodiments. In particular, FIG. 5C illustrates how the driver 360 handles modifications to the page table by the main OS kernel 320. By performing the steps in FIG. 5C, the OS kernel 320 can ensure that both the OS and accelerator devices remain TLB cache coherent.

Driver Intercepts a Page Table Entry Modification/Invalidation Event and Issues a TLB Flush to all Affected Accelerator Devices When the OS kernel 320 modifies a page table entry (e.g., OS invalidate the page table entry when a memory page is selected for deletion or changes access permissions for that entry), at step 560, the driver immediately intercepts that the OS kernel 320 has made some changes to the page table entries. As step 565, the driver 360 issues a TLB flush to all affected accelerator devices to notify the affected accelerator devices (via TLB flush). Thus, when the driver detects the change or modification to the page table entry at step 560, and before the OS can do anything else with the memory page, the driver 360 issues a TLB flush notification (step 565) to all of the accelerator devices 390 that may potentially use the relevant page table to notify the accelerator devices 390 that they are to perform a TLB flush.

The specific details of TLB flush notification to accelerator device are device specific, and the TLB flush notification can be issued using a device specific mechanism. For example, when the accelerator devices are isolated CPU processor cores, the TLB flush notification can be implemented using an IPI or a VMMCALL instruction).

Driver Waits for Accelerators to Signal TLB Flush Completion.

Before the OS is allowed to actually delete the contents of the page or assign it to another process, the driver 360 waits for a confirmation from each of the affected accelerator devices that the TLB flush has been completed. At step 570, the driver 360 checks to determine whether a TLB flush confirmation signal has been received from all accelerator devices (that may potentially use the specified page table) to ensure that all such devices have performed the TLB flush. By confirming that all accelerator devices have completed the TLB flush the driver 360 can ensure that all accelerator devices that may potentially use the specified page table have performed the TLB flush. The mechanism used by the accelerator device to indicate the TLB flush completion is device specific (e.g., it could be done via an interrupt or some other equivalent mechanism). In some implementations, this may require a modification to OS to pass appropriate notification to device driver 360 for accelerator device 390.

Once all of the accelerator devices 390 have signaled that the TLB flush has completed (i.e., that they successfully flushed the affected page table entry), the method proceeds to step 575, where the driver 360 will allow the OS kernel 320 to release the memory page and/or reuse it from some other task. In other words, because the page table entry was invalidated, the OS kernel 320 can potentially assign the memory page to another process or reuse for some other task). The method then returns to step 515 of FIG. 5A.

It is noted that if the OS kernel 320 invalidates a page that is currently in use by the accelerator device 390, the accelerator device 390 will simply generate a page fault (as described at step 520) that will be handled as described above with respect to steps 530 through 550. If the device driver 360 uses OS services to handle page faults, the OS kernel 320 should quickly become aware that certain pages are being actively used and may take that information into account when deciding if/what other pages to invalidate next. This allows the accelerator device 390 to take advantage of any advanced techniques used by the OS kernel 320 for memory management.

Process Termination

Figure 5D:
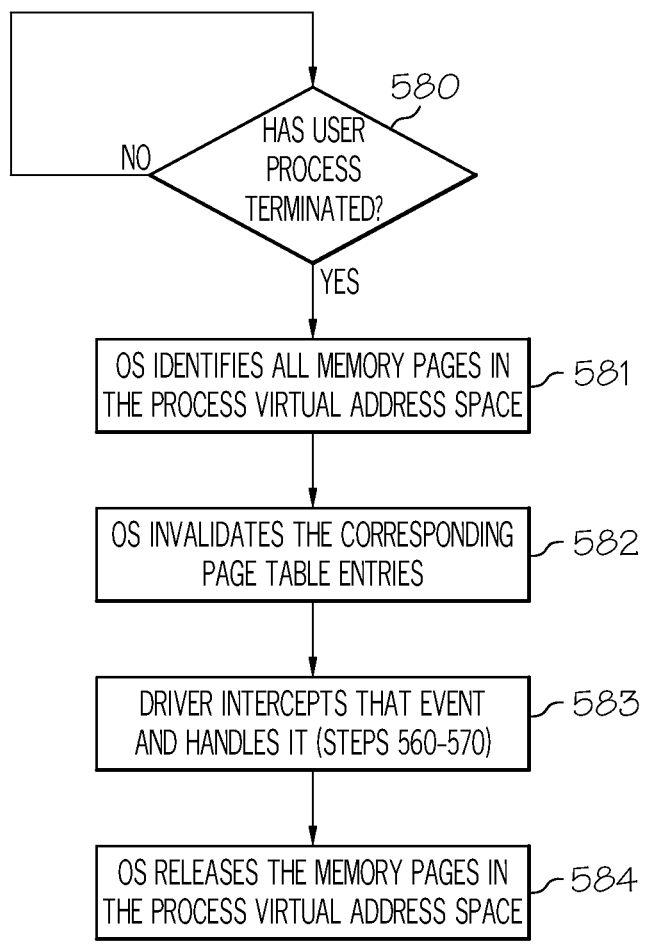

FIG. 5D is a flowchart illustrating a method for invalidating page table entries and removing memory pages when the OS kernel 320 determines that the process has terminated in accordance with the disclosed embodiments.

At step 580, the OS kernel 320 determines whether the process (that owns memory being used by accelerator device 390) has terminated. When the OS kernel 320 determines that the process has not terminated, the method 500 loops back to step 580. In other words, at step 580, the OS kernel 320 continuously monitors whether the process has terminated.

When the OS kernel 320 determines that the process has terminated, the method 500 proceeds to step 581 to prevent the accelerator device(s) from accessing the pages. At step 581, the OS kernel 320 identifies all memory pages in the process VMAS, and selects the identified memory pages for deletion.

At step 582, the OS kernel 320 invalidates the corresponding page table entries for each of the memory pages (selected at step 581) by marking their corresponding page table entries as invalid.

At step 583, the driver 360 intercepts an event and performs processing that is required before it can release each of the virtual memory pages used by the accelerator device 390. Step 583 can be performed in a manner identical to steps 560-570 of FIG. 5C and for sake of brevity will not be described here again. At step 584, the OS kernel 320 releases the underlying physical memory in the process VMAS back to the OS physical memory pool.

Support for Accelerator Devices that do not Support a Complete Page Table Mechanism and can not Walk the Page Tables As noted above, the methods 400 and 500 both requires that the accelerator device can work with page tables and perform a virtual to physical memory address translation using the page table (if the translation entry is not found in the TLB cache). However, in some implementations, an accelerator device may not support a complete page table mechanism (e.g., may only support simple TLB address translation) and/or may not directly support the "walking" of the page tables. Some accelerator devices may not be capable of walking the page tables to translate process virtual memory address to system physical memory address. This may be due to cost constraints, technical limitations or other concerns. Even some accelerator devices (e.g., certain CPUs) that fully support virtual memory concepts are unable to walk page tables and translate addresses on their own. Typically, such accelerator devices only keep simple address translation tables (similar to TLB) and rely on the main OS/driver to perform the necessary translation. When executing work unit code and/or accessing data in process memory, such accelerator devices would use the simple address translation table to obtain the system physical memory address. If no appropriate entry existed in the simple address translation table, the accelerator device would incur a page fault and notify the main OS/driver.

Thus, in accordance with other disclosed embodiments that will be described with reference to FIGS. 6A-6E and FIGS. 7A-7D, methods 600, 700 are provided to address these situations as. In these embodiments, the embodiments described above with respect to FIGS. 4A-4E and 5A-5D can be modified and used with accelerator devices that either do not support a complete page table mechanism and/or do not support the same exact format of the page tables. In such embodiments, the operating system and driver will still use the page table (separate or shared) to perform the necessary address translation and provide the result to the accelerator device as requested.

FIG. 6A-6E are flowcharts illustrating a memory sharing method 600 for using non-shared page tables at an accelerator device to share physical memory that is managed by a main OS kernel 320 in accordance with some of the disclosed embodiments. The method 600 can be applied when the accelerator device does not support page tables at all, but instead requires simple TLB address translation. In one implementation of this method 600 that will be described below, the memory sharing memory mechanism will be implemented at a device driver (e.g., the KMDD 260 of FIG.

2). Although the memory sharing method 600 will be described below as being implemented in a device driver 260, it is noted that a similar implementation can be provided directly in the main OS kernel 220 to handle memory sharing with accelerator devices.

There are many similarities between the embodiments of FIGS. 4A-4E and the embodiments of FIGS. 6A-6E. For sake of brevity only the differences between the embodiments of FIGS. 4A-4E and the embodiments of FIGS. 6A-6E will now be described.

Figure 6A:
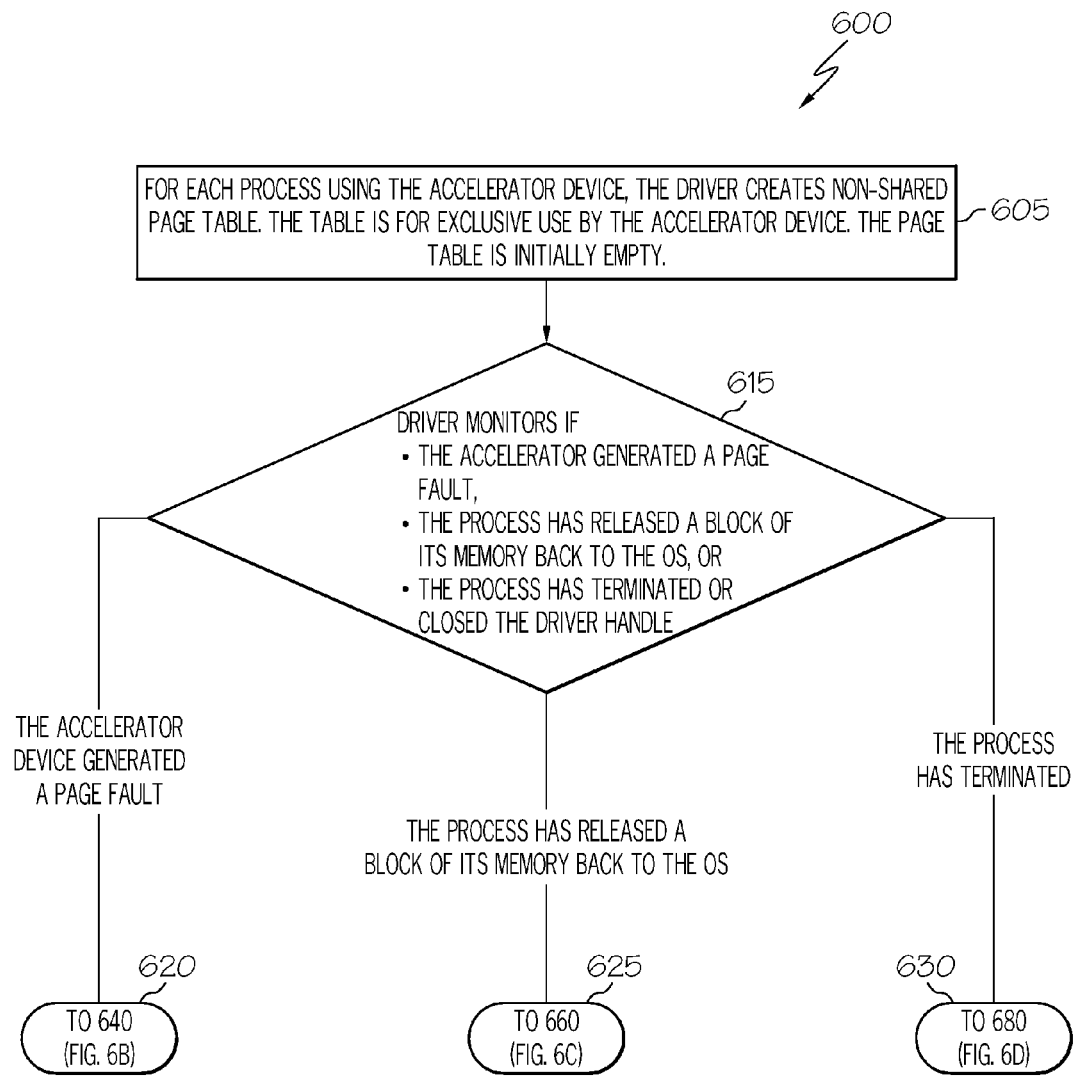
FIG. 6A-6E are flowcharts illustrating a memory sharing method for using non-shared page tables at an accelerator device to share physical memory that is managed by a main OS in accordance with some of the disclosed embodiments.

FIG. 6A differs from FIG. 4A in that step 410 of FIG. 4A is not performed in method 600. In method 600, the accelerator device does not use the page table directly, but instead the driver will have to perform a page table lookup. As such, in method 600 the driver 260 does not provide the address of the page table to the accelerator device 290 (as it does in step 410 of FIG. 4A).

Figure 6B:
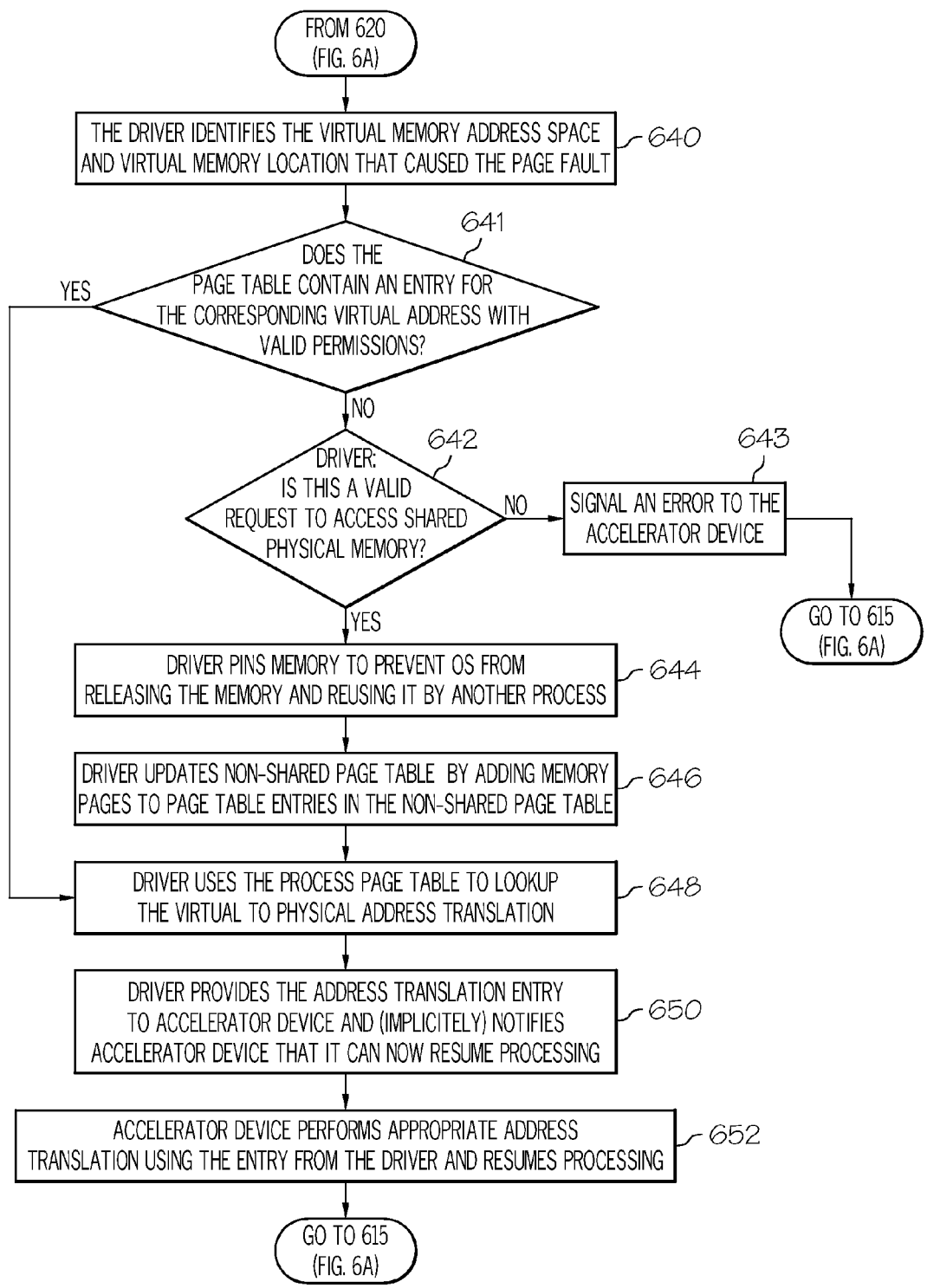

FIG. 6B is a flowchart illustrating how the driver handles page faults signaled by the accelerator device. FIG. 6B differs from FIG. 4B in that two additional steps 641, 648 are performed in method 600, and steps 650 and 652 of method 600 are slightly different in comparison to steps 450 and 452 of method 400.

When the accelerator device signals a page fault, the driver 260 identifies memory address space (owner process) and virtual memory location of the address in the virtual memory (at step 640), and then the driver determines, at step 641, whether the page table includes a valid address translation (i.e., an entry for the corresponding virtual memory address with valid permissions).

When the driver determines (at step 641) that the page table does not include a valid address translation (i.e., that the page table either does not include the required address translation entry for the corresponding virtual memory address, or that permissions are invalid because the accelerator does not have the required access privileges), the method 600 proceeds to step 642, which is identical to step 442 of FIG. 4B. Permissions are invalid, for example, when the accelerator tries to write to a read-only memory page.

When the driver determines (at step 641) that the page table includes a valid address translation (i.e., an entry for the corresponding virtual memory address with valid permissions), the method 600 proceeds directly to step 648, where the driver uses the process page table to lookup the virtual memory address to physical memory address translation. In other words, at step 648, the driver uses the page table to perform the virtual to physical memory address translation. The method 600 then proceeds to step 650. At step 650, the driver provides the address translation entry to the accelerator device and notifies the accelerator device that it can now resume processing. (By contrast, in method 400 the driver only updates the page table, and at step 450 of method 400, the driver 260 notifies the accelerator device 290 that the page fault has been successfully handled and that it can now resume processing and execution of the work unit, at which point the accelerator device must then use the page table to obtain the address translation entry.) The method 600 then proceeds to step 652, where the accelerator device 290 performs virtual address translation using the entry from the driver and resumes processing until a next page fault occurs. (By contrast, at step 452 of method 400, the accelerator device 290 performs virtual address translation using the newly added/updated translation entry (or entries) from non-shared page table 270.)

Figure 6C:
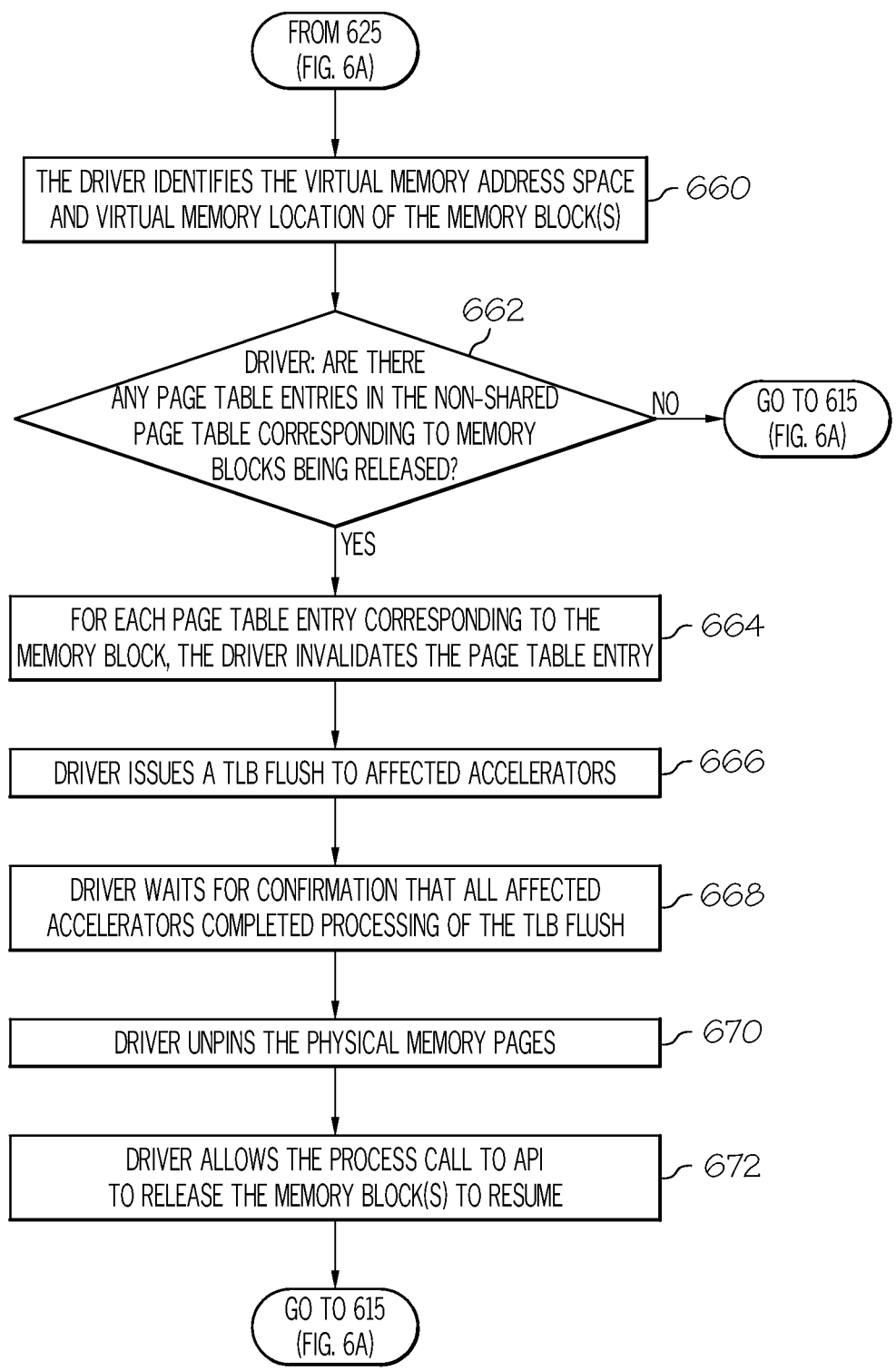
Figure 6D:
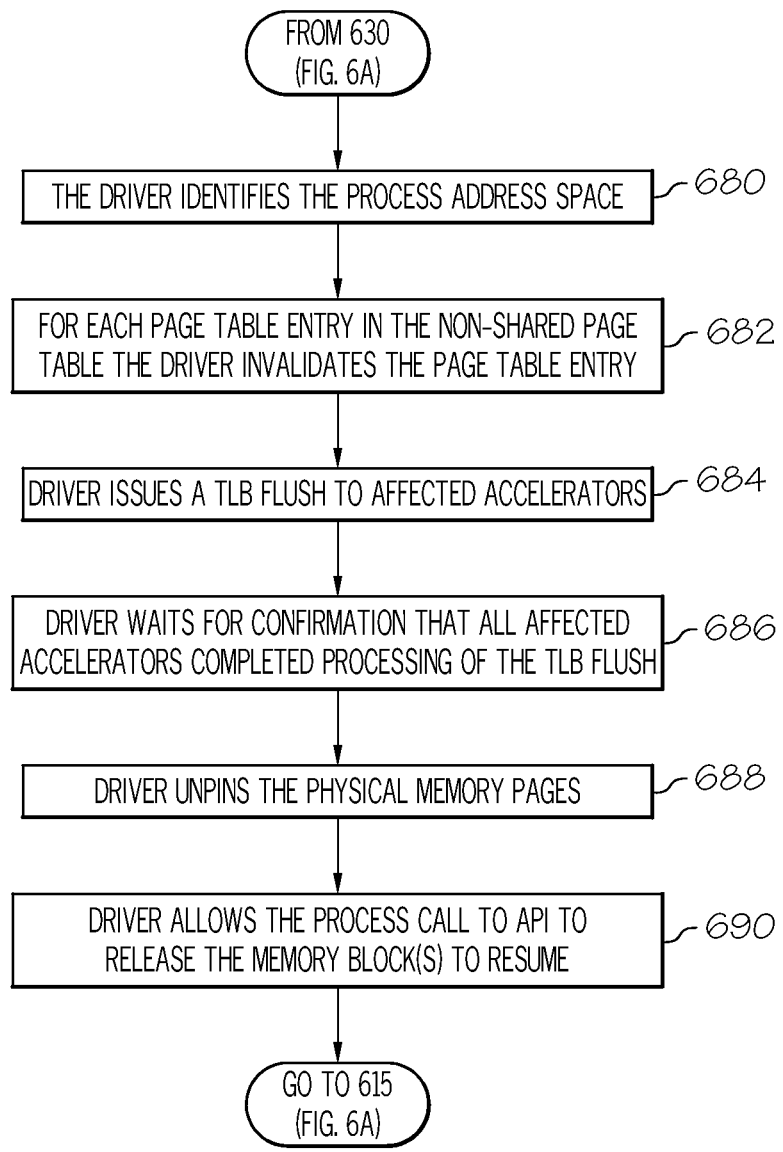
Figure 6E:
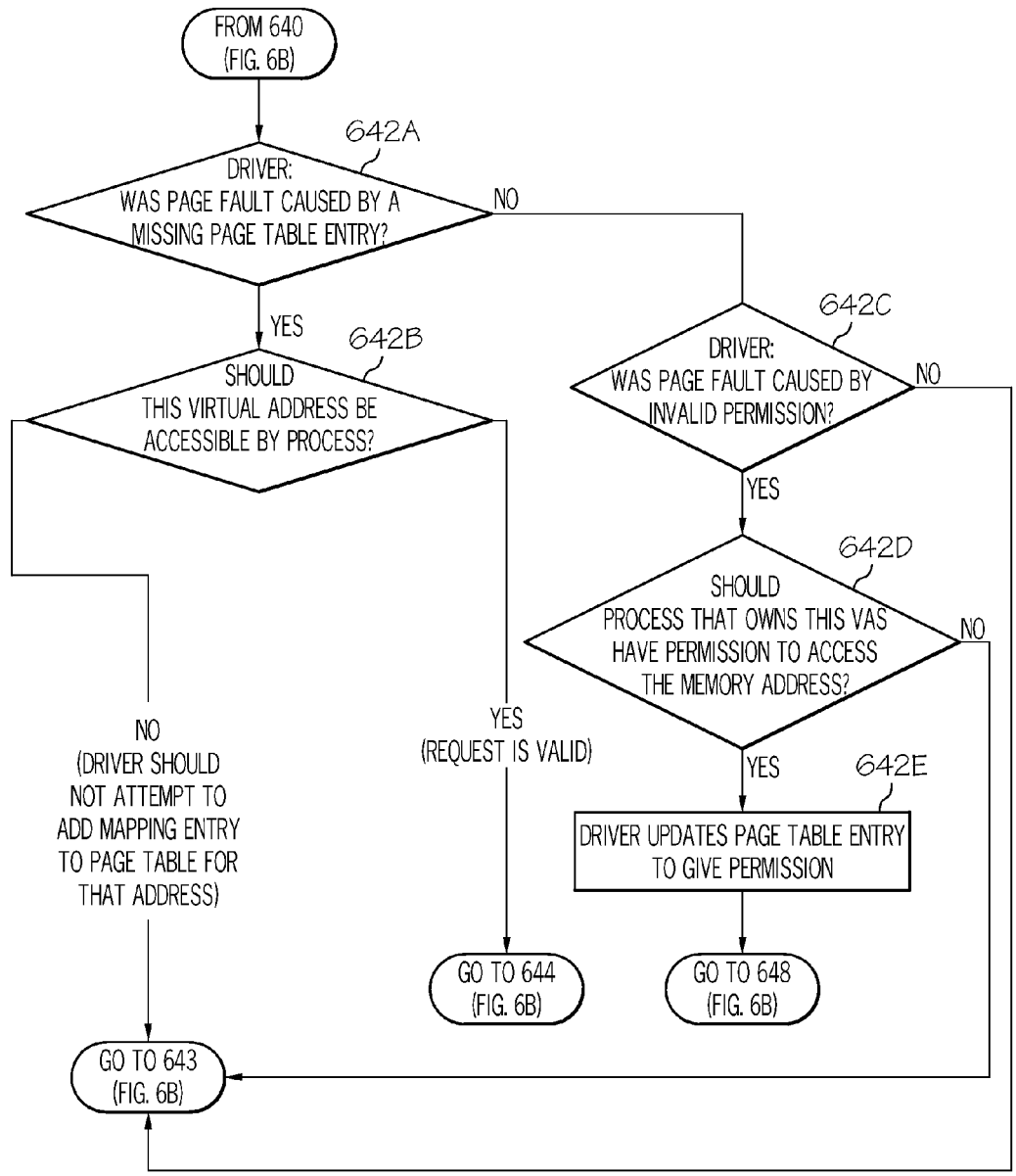

The steps described in FIGS. 6C-6E are identical to those described above with respect to FIGS. 4C-4E, and therefore will not be described here again.

FIG. 7A-7D are flowcharts illustrating a memory sharing method 700 for using shared OS page tables at an accelerator device to share physical memory that is managed by a main OS kernel 320 when the accelerator device does not support page tables, but instead employs simple TLB address translation in accordance with some of the disclosed embodiments. The difference between this method and the method 600 is that in this method the driver will use the OS created/maintained page tables instead of its own to obtain the virtual to physical memory address translations. This method 700 can be used only if the driver has a mechanism to detect if/when the OS has made any changes to the page table entries.

There are many similarities between the embodiments of FIGS. 5A-5D and the embodiments of FIGS. 7A-7D. For sake of brevity only the differences between the embodiments of FIGS. 5A-5D and the embodiments of FIGS. 7A-7D will now be described.

Figure 7A:
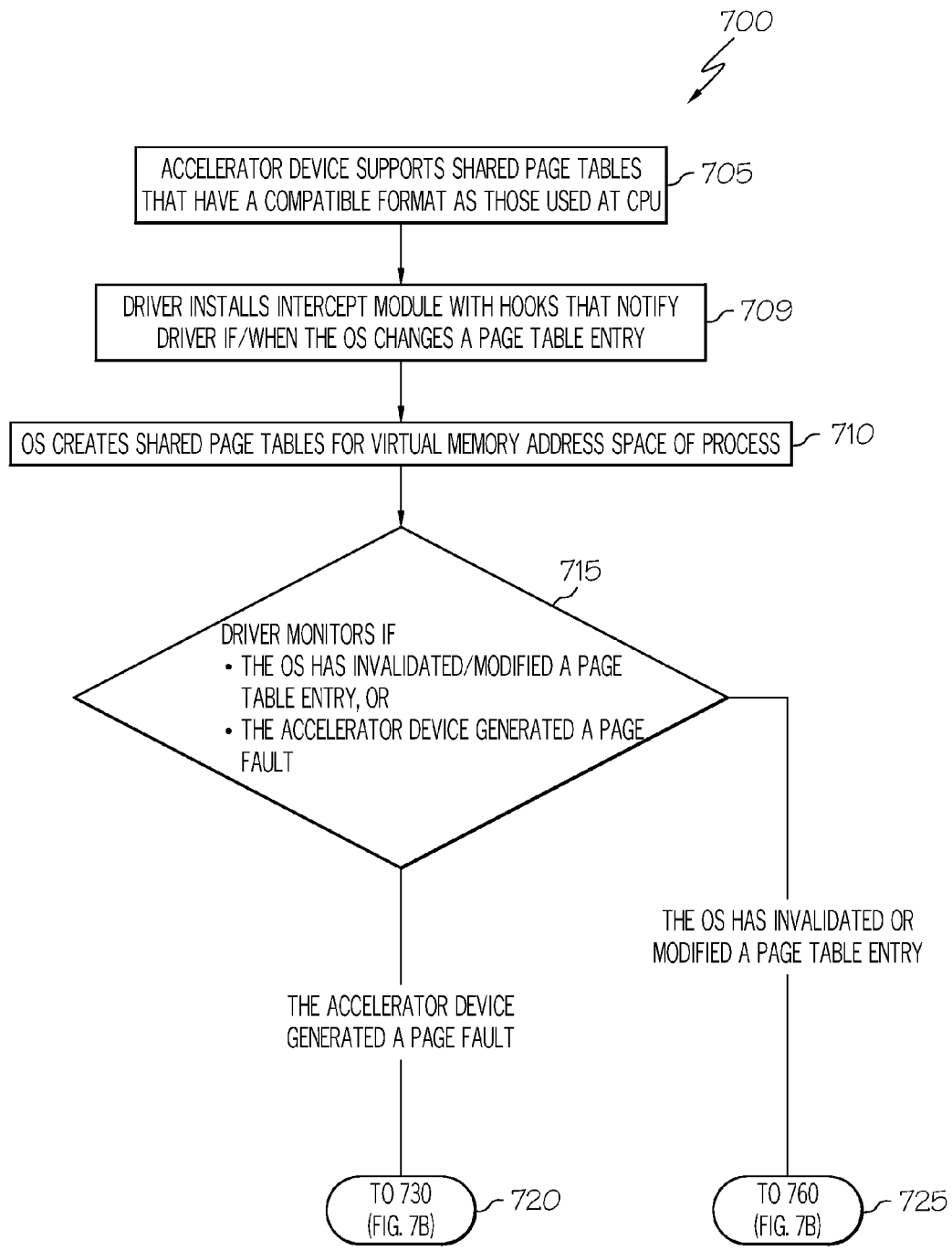
FIG. 7A-7D are flowcharts illustrating a memory sharing method for using shared OS page tables at an accelerator device to share physical memory that is managed by a main OS in accordance with some of the disclosed embodiments.

FIG. 7A differs from FIG. 5A in that step 512 of FIG. 5A is not performed in method 700. After the OS kernel 320 creates page tables 340 (for each process) that will also be used (shared) by the device driver 360 to obtain address translation entries for the accelerator device 390, the method 700 proceeds directly to step 715. In method 700, the accelerator device does not use the page table directly, but instead the driver will have to perform a page table lookup. As such, in method 700 the driver 260 does not obtain addresses of shared page tables from the OS and provide the addresses of the shared page tables to the accelerator device 290 (as it does in step 512 of FIG. 5A). At step 715 the driver monitors the system for page faults (from the accelerator device) and page table entry changes (by the OS) just as it does at step 515 of FIG. 5A.

Figure 7B:
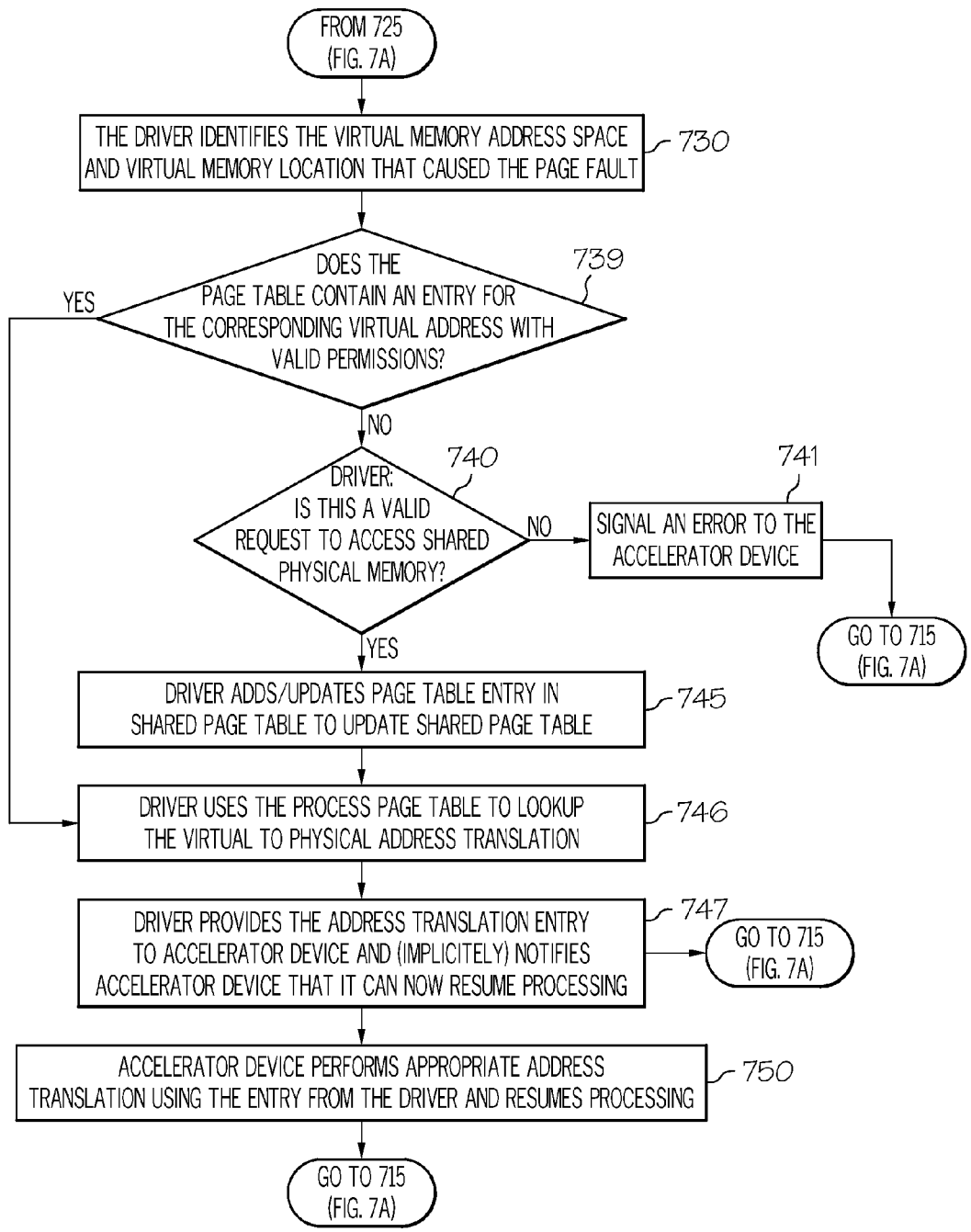

FIG. 7B is a flowchart illustrating how the driver handles page faults signaled by the accelerator device. FIG. 7B differs from FIG. 5B in that two additional steps 739, 746 are performed in method 700, and steps 747 and 750 of method 700 are slightly different in comparison to steps 547 and 550 of method 500.

When the accelerator device signals a page fault, the driver 260 identifies memory address space (owner process) and location of the address in the virtual memory (at step 740), and then the driver determines, at step 739, whether the page table includes a valid address translation (i.e., an entry for the corresponding virtual memory address with valid permissions).

When the driver determines (at step 739) that the page table does not include a valid address translation (i.e., that the page table either does not include the required address translation entry for the corresponding virtual memory address, or that permissions are invalid because the accelerator does not have the required access privileges), the method 700 proceeds to step 740, which is identical to step 540 of FIG. 5B. Permissions are invalid, for example, when the accelerator device tries to write to a read-only memory page.

When the driver determines (at step 739) that the page table includes a valid address translation (i.e., an entry for the corresponding virtual memory address with valid permissions), the method 700 proceeds directly to step 746, where the driver uses the process page table to lookup the virtual memory address to physical memory address translation. In other words, at step 746, the driver uses the page table to perform the virtual to physical memory address translation (i.e., lookup address translation entries in the page table) and provides the lookup result to the accelerator device. The method 700 then proceeds to step 747, where the driver provides the address translation entry to the accelerator device and implicitly notifies the accelerator device that it can now resume processing. (By contrast, at step 547 of method 500, the driver 260 explicitly notifies the accelerator device 290 that the page fault has been successfully handled and implicitly notifies the accelerator device that the page table has been updated and it can now resume processing and execution of the work unit) The method 700 then proceeds to step 750, where the accelerator device 290 performs virtual address translation using the entry from the driver and resumes processing until a next page fault occurs. (By contrast, at step 550 of method 500, the accelerator device 290 performs virtual address translation using the newly added/updated translation entry (or entries) from non-shared page table 270.)

Figure 7C:
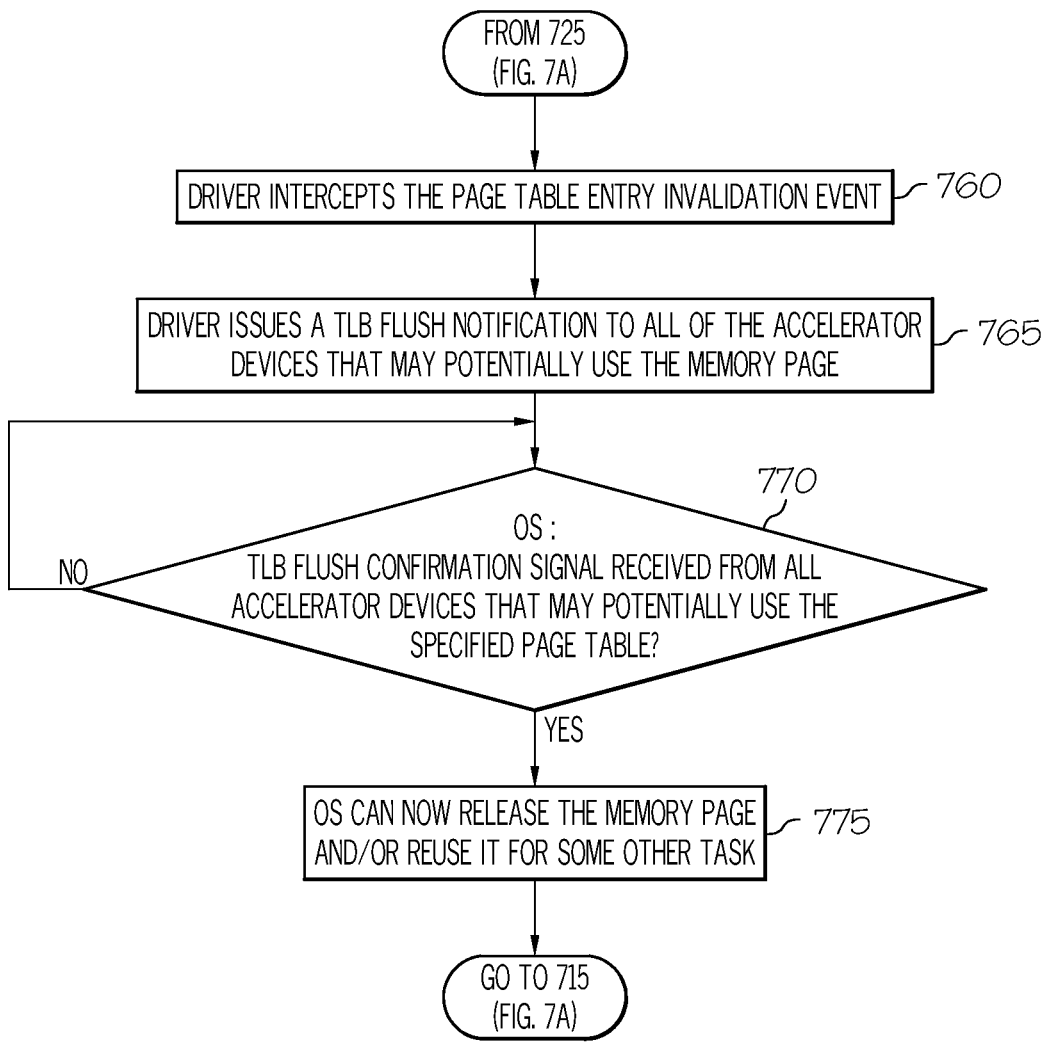
Figure 7D:
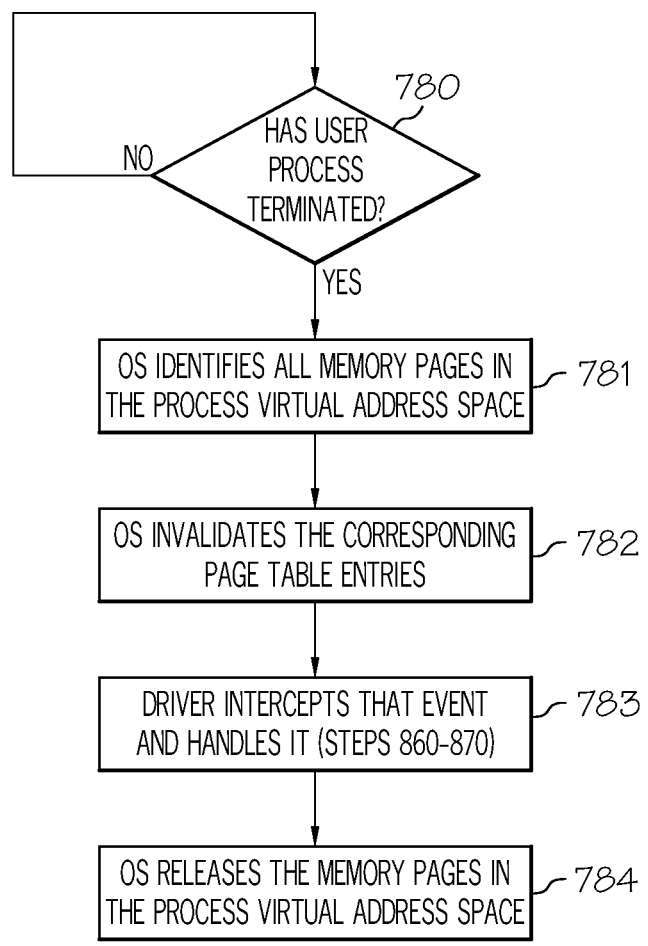

The steps described in FIGS. 7C-7D are identical to those described above with respect to FIGS. 5C-5D, and for sake of brevity, will not be described here again.

Figure 8:
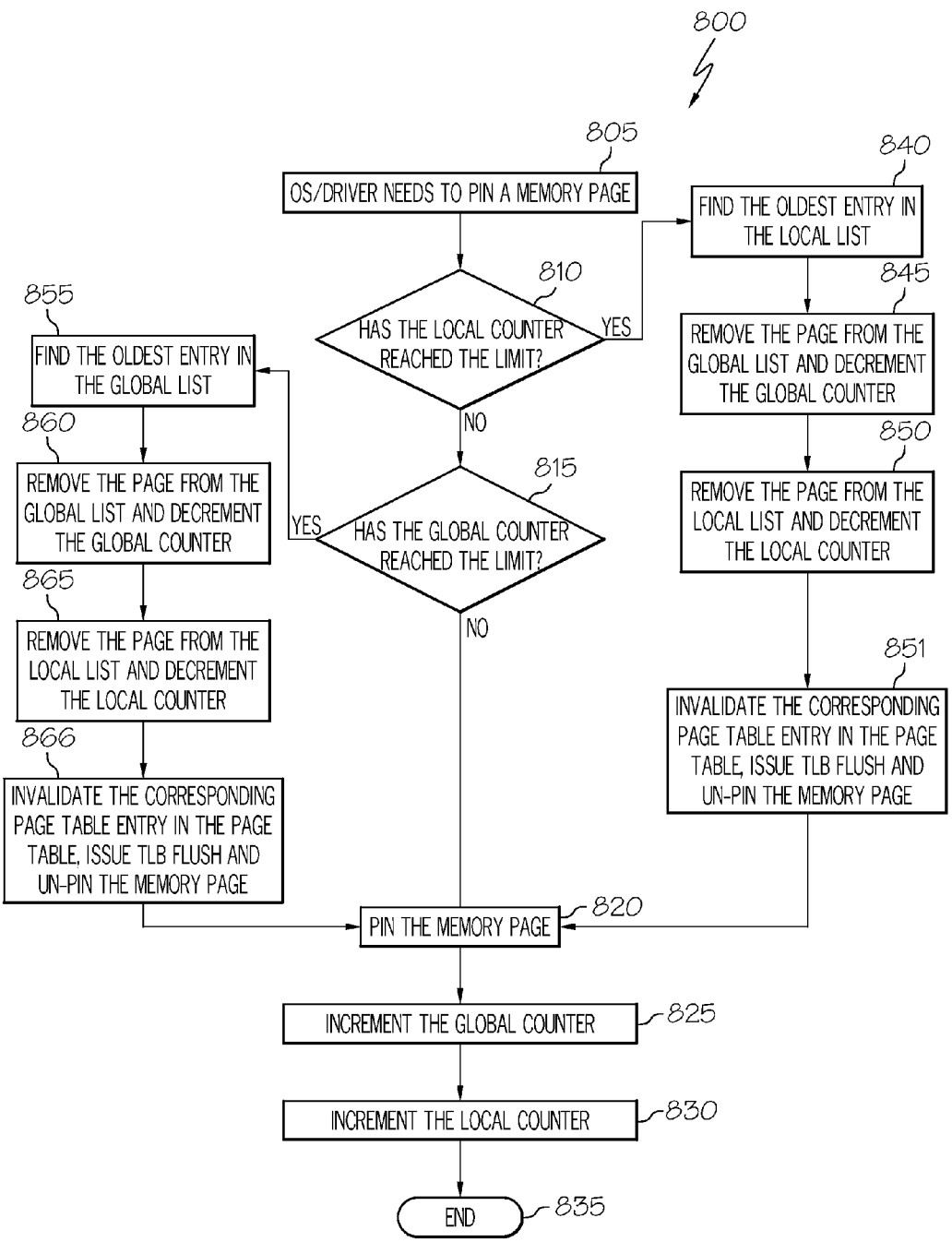
FIG. 8 is a flowchart illustrating a method for determining whether a main OS or driver has pinned too many memory pages in accordance with some of the disclosed embodiments.

FIG. 8 is a flowchart illustrating a method 800 for determining whether a main OS or driver has pinned too many memory pages in accordance with some of the disclosed embodiments. The method 800 can be used in conjunction with the embodiments illustrated in FIGS. 4 and 6. It shows in detail one exemplary implementation of steps 444 (of FIG. 4B) and 644 (of FIG. 6B).

Prior to the method 800, it is noted that either the OS or the driver (described below as "OS/driver") creates and maintains a global list and counter of pinned pages (shared by all processes that interact with the accelerator device). There will be only one instance of this list and counter. In addition, whenever a new process is started or begins to use the accelerator device, the OS/driver creates and maintains a local list and counter of pinned pages for that processes only. There may be multiple instances of this list and counter, one instance for each process.

The method 800 starts at step 805 when the OS/driver determines that it needs to pin a memory page, and at step 810, the OS/driver determines whether the local counter has reached a limit (e.g., a maximum number of pinned pages for that process). When the OS/driver determines that the local counter has not yet reached the limit, the method proceeds to step 815, where the OS/driver determines whether the global counter has reached a limit (e.g., a maximum number of pinned pages shared by all processes that interact with the external or accelerator device). When the OS/driver determines that the global counter has not yet reached the limit, the method 800 proceeds to step 820, where the OS/driver pins the memory page. At step 825, the OS/driver increments the global counter, and at step 830, the OS/driver increments the local counter for the process that "owns" the memory page. The method 800 then ends at step 835.

When the OS/driver determines (at step 810) that the local counter has reached the limit, the method 800 proceeds to step 840, where the OS/driver determines the oldest entry in the local list, and then to step 845, where the OS/driver removes the oldest page from the global list and decrements the global counter. At step 850, the OS/driver removes the oldest page from the local list and decrements the local counter for the process that owns the memory page. The method then proceeds to step 820, where the OS/driver pins the memory page. To help ensure cache coherency with the accelerator devices, at step 851 the OS/Driver must first invalidate the corresponding page table entry, issue a TLB flush to the affected accelerator devices, wait for the accelerator devices to signal that they flushed the corresponding entries from their TLB, and then unpin the previously pinned memory page (the oldest entry removed from the local list). Step 851 can be implemented similar to steps 464-470 of FIG. 4C. At step 825, the OS/driver increments the global counter, and at step 830, the OS/driver increments the local counter for the process that "owns" the memory page. The method 800 then ends at step 835.

When the OS/driver determines (at step 815) that the global counter has reached the limit, the method 800 proceeds to step 855, where the OS/driver determines the oldest entry in the global list, and then to step 860, where the OS/driver removes the oldest page from the global list and decrements the global counter. At step 865, the OS/driver removes the oldest page from the local list and decrements the local counter for the process that owns the memory page. At step 866 To help ensure cache coherency with the accelerator devices, at step 866 the OS/Driver must first invalidate the corresponding page table entry, issue a TLB flush to the affected accelerator devices, wait for the accelerator devices to signal that they flushed the corresponding entries from their TLB, and then unpin the previously pinned memory page (the oldest entry removed from the global list). Step 851 can be implemented similar to steps 464-470 of FIG. 4C. The method then proceeds to step 820, where the OS/driver pins the memory page. At step 825, the OS/driver increments the global counter, and at step 830, the OS/driver increments the local counter for the process that "owns" the memory page.

The method 800 then ends at step 835.

Figure 9:
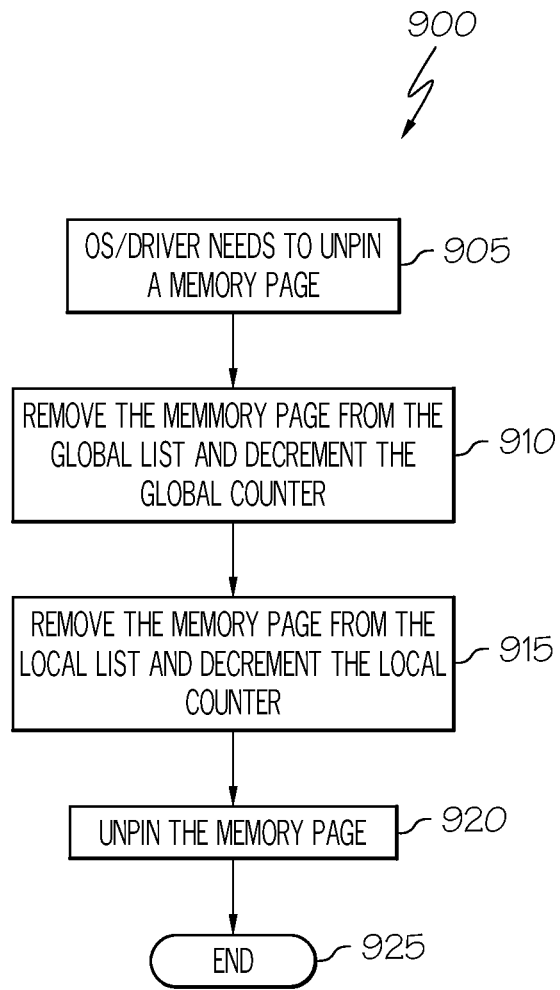
FIG. 9 is a flowchart illustrating a method for determining how to select which memory page(s) to unpin before pinning additional memory page(s) in accordance with some of the disclosed embodiments.

FIG. 9 is a flowchart illustrating a method 900 for determining how to select which memory page(s) to unpin before pinning additional memory page(s) in accordance with some of the disclosed embodiments. The method 900 can be used in conjunction with the embodiments illustrated in FIGS. 4 and 6. It shows in detail one exemplary implementation of step 470 (of FIG. 4C), step 488 (of FIG. 4D), step 670 (of FIG. 6C) and step 688 (of FIG. 4D). As described above, the OS/driver creates and maintains a global list and counter of pinned pages (shared by all processes that interact with the accelerator device). There will be only one instance of this list and counter. In addition, whenever a new process is started or begins to use the accelerator device, the OS/driver creates and maintains a local list and counter of pinned pages for that processes only. There may be multiple instances of this list and counter, one instance for each process.

The method 900 begins at step 905 when the OS/driver determines that it needs to unpin a memory page, and at step 910, the OS/driver removes the memory page from the global list and decrements the global counter. Similarly, at step 915, the OS/driver removes the memory page from the local list and decrements the local counter for the process that owns the memory page. At step 920, the OS/driver unpins the memory page and the method 900 ends at step 925.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for allowing an accelerator device to share physical memory of a computer system that is managed by and operates under control of an operating system of the computer system, the method comprising:

creating a plurality of operating system (OS) page tables for memory management;

creating, at a driver, a plurality of non-shared page tables maintained by the driver, wherein the non-shared page tables are independent of the operating system, are distinct from the OS page tables, and are to be used exclusively by the accelerator device to share the physical memory;

pinning memory pages referenced in the plurality of non-shared page tables to prevent reuse of the memory pages referenced in the non-shared page tables;

maintaining a global list of and a global counter for pinned memory pages for processes that interact with the accelerator device; and maintaining local lists of and local counters for pinned memory pages for respective processes that interact with the accelerator device.

2. A method according to claim 1, further comprising:
monitoring for page fault notifications generated by the accelerator device at the driver; and
handling page fault notifications received from the accelerator device at the driver.

3. A method according to claim 2, wherein the physical memory is divided into a plurality of memory pages, wherein each of the OS page tables is associated with corresponding memory pages in the physical memory, and wherein each of the non-shared page tables is associated with corresponding memory pages in the physical memory.

4. A method according to claim 3, wherein the operating system creates the OS page tables when the operating system creates a process for the accelerator device, and wherein each of the non-shared page tables includes a plurality of page table entries that are used to store mappings of virtual memory addresses to physical memory addresses in the physical memory, and wherein the step of handling page fault notifications received from the accelerator device at the driver comprises:
determining, at the driver, a memory address space and virtual memory location of the process that contains a virtual memory address specified in a request for access to the physical memory that triggered a page fault and caused a page fault notification from the accelerator device;
determining, at the driver, whether the request from the accelerator device for access to physical memory that triggered the page fault is a valid request;
sending an error signal to the accelerator device from the driver when the request from the accelerator device for access to physical memory is determined to be invalid to indicate that the page fault could not be successfully handled;
pinning, at the driver when the request from the accelerator device for access to physical memory is determined to be valid, a limited amount of memory pages of the physical memory for use by the accelerator device to prevent the process from releasing the limited amount of memory pages of the physical memory;
updating, at the driver, a non-shared page table, the updating comprising adding new page table entries in the non-shared page table or editing existing page table entries in the non-shared page table; and
when the non-shared page table is updated, notifying the accelerator device that the page fault has been successfully handled and that the accelerator device is permitted to resume processing; and further comprising:
using the new page table entries or edited existing page table entries from the non-shared page table at the accelerator device when processing resumes to perform virtual address translation.

5. A method according to claim 2, wherein the step of handling page fault notifications received from the accelerator device at the driver further comprises:
determining whether a page fault was caused by a missing page table entry in the non-shared page tables;
when the driver determines that the page fault was caused by the missing page table entry, determining whether the accelerator device has permission to access a memory location at a virtual memory address specified by a request corresponding to the page fault; and
when the driver determines that the accelerator device has permission to access the memory location at the specified virtual memory address, updating a non-shared page table by adding new page table entries or editing existing page table entries in the non-shared page table for the memory pages being used by the accelerator device.

6. A method according to claim 5, wherein the step of handling page fault notifications received from the accelerator device at the driver further comprises:
when the driver determines that the page fault was not caused by a missing page table entry, determining whether the page fault was caused because the accelerator device did not have valid permission to access the memory location at the specified virtual memory address;
when the driver determines that the accelerator device has caused the page fault because the accelerator device did not have valid permission to access the memory location at the specified virtual memory address, determining whether a process that owns virtual memory address space including the specified virtual memory address should have permission to access the memory location at the specified virtual memory address; and
when the driver determines that the process should have permission to access the memory location at the specified virtual memory address, updating the corresponding page table entry to give permission to the process to access the memory location at the specified virtual memory address.

7. A method according to claim 5, wherein the step of handling page fault notifications received from the accelerator device at the driver further comprises:
sending an error signal to the accelerator device to indicate that the page fault could not be successfully handled when the driver determines that: (1) the accelerator device does not have permission to access the memory location at the specified virtual memory address, (2) the page fault was not caused because the accelerator device did not have valid permission to access the memory location at the specified virtual memory address, or (3) a process that owns virtual memory address space including the specified virtual memory address should not have the permission to access the memory location at the specified virtual memory address.

8. A method according to claim 2, wherein the physical memory is divided into a plurality of memory pages, wherein each of the OS page tables is associated with corresponding memory pages in the physical memory, wherein each of the non-shared page tables is associated with corresponding memory pages in the physical memory, and further comprising:

determining, at the driver, whether a process has released a block of memory back to the operating system;

determining, when the module determines that the process has released the block of memory back to the operating system, a memory address space and location of the block of memory;

determining, at the driver, whether a non-shared page table includes a page table entry corresponding to the block of memory being released;

identifying each memory page that corresponds to the block of memory being released when the non-shared page table includes a page table entry corresponding to the block of memory being released; and invalidating each page table entry in the non-shared page table corresponding to the block of memory being released to ensure that the corresponding memory blocks and corresponding memory pages are no longer used by the accelerator device.

9. A method according to claim 8, wherein the accelerator device includes a translation lookaside buffer (TLB) cache of recently used page table translation entries, and further comprising:

issuing a TLB flush signal to the accelerator device to flush the translation lookaside buffer (TLB) cache of any page table entries that were invalidated;

waiting for a confirmation signal from the accelerator device confirming that the accelerator device has completed the TLB flush operation and removed the page table entries;

unpinning physical memory pages corresponding to the block of memory being released by the process so that the physical memory pages are no longer accessible to the accelerator device; and allowing a process call to release the block of memory to resume and complete.

10. A method according to claim 2, wherein the physical memory is divided into a plurality of memory pages, wherein each of the OS page tables is associated with corresponding memory pages in the physical memory, wherein each of the non-shared page tables is associated with corresponding memory pages in the physical memory, and further comprising:

determining, at the driver, whether a process has terminated;

when the process has terminated, identifying an address space of the process that includes memory pages that are to be unpinned; and invalidating page table entries in the non-shared page tables, the page table entries corresponding to the memory pages that are to be unpinned.

11. A method according to claim 10, wherein the accelerator device includes a translation lookaside buffer (TLB) cache of recently used page table translation entries, and further comprising:

issuing a TLB flush signal to the accelerator device to flush the translation lookaside buffer (TLB) cache of any page table entries that were invalidated;

waiting for a confirmation signal from the accelerator device confirming that the accelerator device has completed the TLB flush operation and removed the page table entries;

unpinning physical memory pages corresponding to a block of memory being released by the process so that the physical memory pages are no longer accessible to the accelerator device; and allowing a process call to release the block of memory to resume and complete.

12. A method for allowing an accelerator device to share physical memory of a computer system that is managed by and operates under control of an operating system of the computer system, the method comprising:

creating a plurality of operating system (OS) page tables for memory management;

creating, at a driver, a plurality of non-shared page tables maintained by the driver, wherein the non-shared page tables are independent of the operating system, are distinct from the OS page tables, and are to be used exclusively by the accelerator device to share the physical memory;

using the non-shared page tables, maintained by the driver, to translate virtual memory addresses assigned to processes to physical memory addresses in the physical memory when the accelerator device needs to access a block of memory in a virtual memory address space (VMAS) assigned to the process;

pinning memory pages referenced in the plurality of non-shared page tables to prevent reuse of the memory pages referenced in the non-shared page tables;

maintaining a global list of and a global counter for pinned memory pages for processes that interact with the accelerator device; and maintaining local lists of and local counters for pinned memory pages for respective processes that interact with the accelerator device.

13. A method according to claim 12, further comprising:

monitoring for page fault notifications generated by the accelerator device at the driver; and handling page fault notifications received from the accelerator device at the driver, wherein the step of handling page fault notifications received from the accelerator device at the driver further comprises:

determining whether the non-shared page tables include page table entries for the corresponding virtual memory addresses with valid permissions to access the virtual memory addresses corresponding to faulting memory locations;

determining, when the non-shared page tables do not include page table entries for the corresponding virtual memory addresses with valid permissions, whether the request from the accelerator device for access to physical memory that triggered the page fault is a valid request;

using the non-shared page tables to lookup virtual memory address to physical memory address translations when the non-shared page tables include page table entries for the corresponding virtual memory addresses with valid permissions;

providing the page table entries from the driver to the accelerator device; and notifying the accelerator device that the accelerator device is permitted to resume processing.

14. A method according to claim 13, further comprising:

using the page table entries from the driver at the accelerator device when processing resumes to perform virtual address translation.

15. A system, comprising:

an accelerator device;

a computer system communicatively coupled to the accelerator device, the computer system comprising:

a main operating system (OS) designed to create a plurality of OS page tables for memory management; and shared physical memory that is managed by and operates under control of the main OS; and a driver for the accelerator device to:
  create and maintain a plurality of non-shared page tables at the driver that are independent of the main OS, are distinct from the OS page tables, and are to be used exclusively by the accelerator device to share the shared physical memory;
  pin memory pages referenced in the plurality of non-shared page tables to prevent reuse of the memory pages referenced in the non-shared page tables;
  maintain a global list of and a global counter for pinned memory pages for processes that interact with the accelerator device; and
  maintain local lists of and local counters for pinned memory pages for respective processes that interact with the accelerator device.

16. A system according to claim 15, wherein the shared physical memory is divided into a plurality of memory pages, wherein each of the OS page tables is associated with corresponding memory pages in the shared physical memory, wherein each of the non-shared page tables is associated with corresponding memory pages in the shared physical memory, and wherein the driver comprises a memory management unit (MMU) that provides a memory management function for the accelerator device, the MMU comprising:
  a page fault notification module designed to continuously monitor the system for page fault notifications generated by the accelerator device; and
  a page fault handler module for handling page fault notifications received from the accelerator device.

17. A system according to claim 16, wherein the operating system creates the OS page tables when the operating system creates a process for the accelerator device, wherein each of the non-shared page tables includes a plurality of page table entries that are used to store mappings of virtual memory addresses to physical memory addresses in the physical memory, and wherein the page fault handler module is designed to:
  determine a memory address space and virtual memory location of the process that contains a virtual memory address specified in a request for access to the shared physical memory, wherein the request for access to the shared physical memory triggered a page fault and caused a page fault notification from the accelerator device;
  determine whether the request from the accelerator device for access to shared physical memory that triggered the page fault is a valid request;
  pin a limited amount of memory pages of the shared physical memory at the specific address of the shared physical memory for use by the accelerator device to prevent the process from releasing the limited amount of memory pages of the shared physical memory when the request from the accelerator device for access to shared physical memory is determined to be valid; and
  update a non-shared page table by adding new page table entries in the non-shared page table or editing existing page table entries in the non-shared page table.

18. A system according to claim 17, wherein, when the non-shared page table is updated, the page fault handler module is further designed to:
  notify the accelerator device that the page fault has been successfully handled and that the accelerator device is permitted to resume processing, and wherein the accelerator device uses the updated page table entries from the non-shared page table when processing resumes to perform virtual address translation.

19. A system according to claim 17, wherein the driver is configured to send an error signal to the accelerator device to indicate that the page fault could not be successfully handled when the request for access to shared physical memory is determined to be invalid.

20. A system according to claim 16, wherein the page fault handler module is designed to:
  determine whether a page fault was caused by a missing page table entry;
  determine whether the accelerator device has permission to access a memory location at a specified virtual memory address when the driver determines that the page fault was caused by the missing page table entry; and
  update a non-shared page table by adding new page table entries or editing existing page table entries in the non-shared page table for the memory pages being used by the accelerator device when the driver determines that the accelerator device has permission to access the memory location at the specified virtual memory address.

21. A system according to claim 20, wherein the page fault handler module is further designed to:
  determine whether the page fault was caused because the accelerator device did not have valid permission to access the memory location at the specified virtual memory address when the driver determines that the page fault was not caused by a missing page table entry;
  determine whether a process that owns virtual memory address space including the specified virtual memory address should have permission to access the memory location at the specified virtual memory address when the driver determines that the accelerator device has caused the page fault because the accelerator device did not have valid permission to access the memory location at the specified virtual memory address; and
  update the corresponding page table entry to give permission to the process to access the memory location at the specified virtual memory address when the driver determines that the process should have permission to access the memory location at the specified virtual memory address.

22. A system according to claim 21, wherein the page fault handler module is further designed to:
  send an error signal to the accelerator device to indicate that the page fault could not be successfully handled when the driver determines that: (1) the accelerator device does not have permission to access the memory location at the specified virtual memory address, (2) the page fault was not caused because the accelerator device did not have valid permission to access the memory location at the specified virtual memory address, or (3) a process that owns virtual memory address space including the specified virtual memory address should not have the permission to access the memory location at the specified virtual memory address.

23. A system according to claim 16, wherein the driver is further designed to:
  determine, when the driver determines that it needs to pin a memory page for a respective process, whether a respective local counter has reached a maximum number of pinned memory pages for the respective process; and
  determine, when the driver determines that the respective local counter has reached the maximum number of pinned memory pages for the respective process, the oldest pinned memory page in a respective local list for the respective process, remove the oldest pinned memory page from the global list and decrement the global counter, remove the oldest pinned memory page from the respective local list and decrement the respective local counter for the respective process; and invalidate a page table entry for the oldest pinned memory page in one of the non-shared page tables, issue a TLB flush to the accelerator device, unpin the oldest pinned memory page, pin a new memory page, increment the global counter, and increment the respective local counter.

24. A system according to claim 23, wherein the driver is further designed to:
determine, when the driver determines that the respective local counter has not yet reached the maximum number of pinned memory pages for the respective process, whether the global counter has reached a maximum number of pinned memory pages shared by all processes that interact with the accelerator device;
pin the memory page when the driver determines that the global counter has not reached the maximum number of pinned memory pages shared by all processes that interact with the accelerator device, increment the global counter, and increment the respective local counter; and
determine, when the driver determines that the global counter has reached a maximum number of pinned memory pages shared by all processes that interact with the accelerator device, the oldest pinned memory page in the global list, remove the oldest pinned memory page from the global list and decrement the global counter, remove the oldest pinned memory page in the global list from a local list and decrement a local counter for a process that owns the oldest pinned memory page in the global list, invalidate a corresponding page table entry in a non-shared page table, issue a TLB flush to the accelerator device, unpin the oldest pinned memory page in the global list, pin a new memory page, increment the global counter, and increment the local counter for the process that owns the memory page.

25. A system according to claim 23, wherein, when the driver determines that a memory page needs to be unpinned before pinning an additional memory page, the driver is further designed to remove a memory page from the global list, decrement the global counter, remove the memory page from a local list, decrement a local counter for a process that owns the memory page, and unpin the memory page.

26. A system according to claim 15, wherein the shared physical memory is divided into a plurality of memory pages, wherein each of the OS page tables is associated with corresponding memory pages in the shared physical memory, wherein each of the non-shared page tables is associated with corresponding memory pages in the shared physical memory, wherein the accelerator device includes a translation lookaside buffer (TLB) cache of recently used page table translation entries, and wherein the driver is further designed to:
continuously monitor the system to determine whether the process has released a block of memory back to the OS;
determine a memory address space and location of the block of memory when the module determines that the process has released the block of memory back to the operating system;
determine whether a non-shared page table includes a page table entry corresponding to the block of memory being released;
identify each memory page that corresponds to the block of memory being released when the non-shared page table includes a page table entry corresponding to the block of memory being released, and invalidate each page table entry in the non-shared page table corresponding to the block of memory being released to ensure that the corresponding memory blocks and corresponding memory pages are no longer used by the accelerator device;
issue a TLB flush signal to the accelerator device to flush the translation lookaside buffer (TLB) cache of any page table entries that were invalidated, and wait for a confirmation signal from the accelerator device confirming that the accelerator device has completed the TLB flush operation and removed the page table entries; and
unpin physical memory pages corresponding to the block of memory being released by the process so that the physical memory pages are no longer accessible to the accelerator device, and allow a process call to release the block of memory to resume and complete.

27. A system according to claim 15, wherein the shared physical memory is divided into a plurality of memory pages, wherein each of the OS page tables is associated with corresponding memory pages in the shared physical memory, wherein each of the non-shared page tables is associated with corresponding memory pages in the shared physical memory, wherein the driver comprises a process termination detection module designed to:
continuously monitor the system to determine whether a process has terminated or closed a last open driver handle;
identify an address space of the process that includes memory pages that are to be unpinned;
invalidate page table entries corresponding to the memory pages that are to be unpinned;
issue a TLB flush signal to the accelerator device to flush the translation lookaside buffer (TLB) cache of any page table entries that were invalidated, and wait for a confirmation signal from the accelerator device confirming that the accelerator device has completed the TLB flush operation and removed the page table entries; and
unpin physical memory pages corresponding to a block of memory being released by the process so that the physical memory pages are no longer accessible to the accelerator device, and allow a process call to release the block of memory to resume and complete.

28. A system according to claim 15, wherein the driver is a kernel mode device driver that runs in protected mode and has unrestricted access to the shared physical memory and the operating system.

29. A system according to claim 15, wherein the computer system further comprises:
a multi-core central processor unit comprising a plurality of core processor devices, wherein virtual addresses assigned to a process are used by at least one of the core processor devices, and wherein each of the core processor devices is associated with one or more of the OS page tables, and
wherein the accelerator device comprises either:
an isolated core processor device that is sequestered for use independently of the operating system; or
an external device that is communicatively coupled to the computer system, wherein the external device comprises a specialized processor that performs tasks independently of the multi-core central processor unit and does not directly execute operating system code.

30. A system according to claim 29, wherein the external device is selected from the group consisting of: a Graphics Processing Unit (GPU); an embedded central processor unit (CPU); an advanced reduced instruction set computer (RISC) central processor unit (CPU); an encryption/decryption device; a compression device; and a network accelerator device.

31. A system, comprising:
an accelerator device;
a computer system communicatively coupled to the accelerator device, the computer system comprising:
- a main operating system (OS) designed to create a plurality of OS page tables for memory management;
- shared physical memory that is managed by and operates under control of the main OS; and
a driver for the accelerator device to:
- create and maintain a plurality of non-shared page tables at the driver that are independent of the main OS, are distinct from the OS page tables, and are to be used exclusively by the accelerator device to share the shared physical memory;
- pin memory pages referenced in the plurality of non-shared page tables to prevent reuse of the memory pages referenced in the non-shared page tables;
- maintain a global list of and a global counter for pinned memory pages for processes that interact with the accelerator device; and
- maintain local lists of and local counters for pinned memory pages for respective processes that interact with the accelerator device,
wherein the driver uses non-shared page tables for virtual memory address translation to translate virtual memory addresses assigned to a process to physical memory addresses in the shared physical memory when the accelerator device needs to access a block of memory in a virtual memory address space (VMAS) assigned to the process.

32. A system according to claim 31, wherein the shared physical memory is divided into a plurality of memory pages, wherein each of the OS page tables is associated with corresponding memory pages in the shared physical memory, wherein each of the non-shared page tables is associated with corresponding memory pages in the shared physical memory, and wherein the driver comprises:
- a memory management unit (MMU) that provides a memory management function for the accelerator device, the MMU comprising:
- a page fault notification module designed to continuously monitor the system for page fault notifications generated by the accelerator device; and
- a page fault handler module for handling page fault notifications received from the accelerator device, wherein the page fault handler module is further designed to:
  - determine whether a non-shared page table includes page table entries for the corresponding virtual memory addresses with valid permissions to access the virtual memory addresses corresponding to faulting memory locations, wherein the request for access to the shared physical memory triggered a page fault and caused a page fault notification from the accelerator device;
  - determine whether the request from the accelerator device for access to shared physical memory that triggered the page fault is a valid request when the non-shared page table does not include page table entries for the corresponding virtual memory addresses with valid permissions to access the virtual memory addresses corresponding to the faulting memory locations;
  - use the non-shared page table to lookup the virtual memory address to physical memory address translations when the non-shared page table does include page table entries for the corresponding virtual memory addresses with valid permissions to access the virtual memory addresses corresponding to the faulting memory locations; and
  - provide the page table entries to the accelerator device and notify the accelerator device that the accelerator device is permitted to resume processing, and wherein the accelerator device uses the page table entries from the driver to perform virtual address translation and resumes processing.

* * * * *